United States Patent
Leen et al.

(10) Patent No.: US 11,639,892 B2
(45) Date of Patent: May 2, 2023

(54) SYSTEMS AND METHODS FOR SKEWED BASIS SET FITTING

(71) Applicant: ABB Schweiz AG, Baden (CH)

(72) Inventors: J. Brian Leen, Sunnyvale, CA (US);
Kyle Owen, East Palo Alto, CA (US);
John Savee, San Francisco, CA (US);
Dmitry Skvortsov, Sunnyvale, CA (US); Paul Hansen, Palo Alto, CA (US); Raphael Desbiens, Quebec (CA)

(73) Assignee: ABB SCHWEIZ AG, Baden (CH)

(*) Notice: Subject to any disclaimer, the term of this patent is extended or adjusted under 35 U.S.C. 154(b) by 256 days.

(21) Appl. No.: 17/221,759

(22) Filed: Apr. 2, 2021

(65) Prior Publication Data
US 2022/0317029 A1  Oct. 6, 2022

(51) Int. Cl.
*G01N 21/31* (2006.01)

(52) U.S. Cl.
CPC ..... *G01N 21/314* (2013.01); *G01N 2021/317* (2013.01); *G01N 2201/061* (2013.01)

(58) Field of Classification Search
CPC ............ G01N 21/39; G01N 21/3504; G01N 2021/391; G01N 21/031; G01N 21/31; G01N 2201/06113; G01N 21/61; G01N 2021/399; G01N 33/497; G01N 29/348; G01N 21/3563; G01N 2021/3595; G01N 2021/398; G01N 21/05; G01N 21/59;
(Continued)

(56) References Cited

U.S. PATENT DOCUMENTS

2017/0075030 A1 * 3/2017 Wheelock ............ G01V 99/005
2018/0306713 A1 * 10/2018 Rao ..................... G01N 21/39

FOREIGN PATENT DOCUMENTS

CN          1553373 A  * 12/2004
CN       103617150 B  *  1/2018
(Continued)

OTHER PUBLICATIONS

Sayres David et al. "A new cavity based absorption instrument for detection of water isotopologues in the upper troposphere and lower stratosphere," Review of Scientific Instruments, American Institute of Physics, 2 Huntington Quadrangle, Melville, NY 11747, vol. 80, No. 4, Apr. 23, 2009, pp. 44102-44102, XP012128223.
(Continued)

*Primary Examiner* — Michael P Stafira
(74) *Attorney, Agent, or Firm* — Armstrong Teasdale LLP

(57) ABSTRACT

Systems and methods for skewed basis set fitting may include obtaining measured absorption data indicative of an amount of absorption of light by a sample gas at each of multiple frequencies, determining an absorption dependent cavity time constant indicative of a skew to the measured absorption data caused by light reflections within a cavity in which the sample gas is contained, obtaining reference absorption data including basis sets indicative of reference amounts of light absorbed by each of multiple gases at each of the multiple frequencies, skewing the reference absorption data based on the absorption dependent cavity time constant to generate skewed reference absorption data, and fitting the measured absorption data to the skewed reference absorption data to identify an amount of at least one constituent gas within the sample gas.

21 Claims, 10 Drawing Sheets

(58) Field of Classification Search
CPC .... G01N 29/46; G01N 21/0332; G01N 29/42; G01N 33/0037; G01N 33/004; G01N 2201/08; G01N 24/08; G01N 21/274; G01N 2291/012; G01N 2291/015; G01N 2291/106; G01N 29/2456; G01N 29/2462; G01N 29/262; G01N 29/343; G01N 29/40; G01N 1/40; G01N 2021/7789; G01N 2033/4975; G01N 21/171; G01N 21/314; G01N 21/359; G01N 21/552; G01N 21/01; G01N 21/45; G01N 2201/0691; G01N 2291/102; G01N 24/10; G01N 29/043; G01N 21/35; G01N 21/3554; G01N 2201/067; G01N 2201/10; G01N 2201/12; G01N 2021/1704; G01N 2021/317; G01N 21/1702; G01N 21/3581; G01N 2201/061; G01N 2201/0697; G01N 2201/084; G01N 2291/0423; G01N 24/088; G01N 29/02; G01N 29/022; G01N 29/24; G01N 29/2418; G01N 29/2437; G01N 29/36; G01N 29/44; G01N 29/4454; G01N 33/0073; G01N 33/054333; G01N 2021/354; G01N 2021/8578; G01N 2030/8868; G01N 21/17; G01N 21/3103; G01N 21/33; G01N 21/85; G01N 2223/202; G01N 2291/0234; G01N 2291/0256; G01N 2291/02836; G01N 2291/0289; G01N 2291/2634; G01N 24/084; G01N 29/036; G01N 29/041; G01N 29/07; G01N 29/11; G01N 29/12; G01N 29/221; G01N 29/223; G01N 29/225; G01N 29/265; G01N 29/28; G01N 29/32; G01N 30/88

See application file for complete search history.

(56) References Cited

FOREIGN PATENT DOCUMENTS

| EP | 3767278 A1 | * | 1/2021 | ............ G01J 3/10 |
| WO | WO-2013142737 A1 | * | 9/2013 | ............ G01J 3/0297 |
| WO | WO-2017017284 A1 | * | 2/2017 | ............ G01J 3/28 |

OTHER PUBLICATIONS

Gupta et al: "Quantitative determination of the (2,0) band of deuterium in the near infrared via off-axis ICOS," Chemical Physics Letters, Elsevier BV, NL, vol. 441, No. 4-6, Jun. 15, 2007, pp. 204-208, XP022118180.

Witinski M. F. et al. "High precision methane isotopologue ratio measurements at ambient mixing ratios using integrated cavity output spectroscopy," Applied Physics B; Lasers and Optics, Springer Berlin, DE, vol. 102, No. 2, Mar. 16, 2010, pp. 375-380, XP019880922.

Extended European Search Report for European Application No. 22165783.6, dated Aug. 8, 2022, 7 pages.

* cited by examiner

SYSTEMS AND METHODS FOR SKEWED BASIS SET FITTING

BACKGROUND

Integrated cavity output spectroscopy (ICOS) is a powerful tool for the detection and quantification of small optical absorbers. For complex, overlapping spectra commonly found in industrial applications, it is beneficial to fit a measured spectrum using a linear combination of basis sets (e.g., previously measured absorption spectra of corresponding gases) and absorption lines (e.g., individual absorption lines calculated from known molecular properties) in order to determine the concentrations of target gases (e.g., within a sample gas). Most ICOS analyzers operate in a regime in which a cavity (e.g., in which the sample gas is contained and irradiated with light) acts as a non-linear low pass filter on a transmitted intensity spectrum. Simple models do not account for the corresponding skewing effect on transmitted intensity spectrum or use only a fixed value in an attempt to account for the spectrum skew. However, failure to accurately model the skew can lead to inaccuracy and cross interference errors, making identification and quantification of constituent gases within a sample gas difficult.

SUMMARY

According to one aspect of the present disclosure, a method may include obtaining, by a compute device, measured absorption data indicative of an amount of absorption of light by a sample gas at each of multiple frequencies. The method may additionally include determining, by the compute device, an absorption dependent cavity time constant indicative of a skew to the measured absorption data caused by light reflections within a cavity in which the sample gas is contained. The method may further include obtaining, by the compute device, reference absorption data including basis sets indicative of reference amounts of light absorbed by each of multiple gases at each of the multiple frequencies. In addition, the method may include skewing, by the compute device, the reference absorption data based on the absorption dependent cavity time constant to generate skewed reference absorption data. The method may further include fitting, by the compute device, the measured absorption data to the skewed reference absorption data to identify an amount of at least one constituent gas within the sample gas.

In some embodiments, obtaining reference absorption data includes obtaining a linear combination of basis sets. The method, in some embodiments, may include obtaining reference absorption data that additionally includes at least one line set. In some embodiments, the method may include determining an effect of at least one of external cavity gas absorption, broadband gas absorption, or etalons on the measured data. Skewing the reference absorption data may include performing analytical Jacobian decomposition. In some embodiments, the method may further include determining an effect of collision broadening on one or more basis sets or a combination of higher order derivatives of basis sets.

The method, in some embodiments, may include purging the cavity with a purge gas and measuring a light intensity and an empty cavity ringdown in the purged cavity before obtaining the measured absorption data. Fitting the measured absorption data, in some embodiments, includes fitting the measured absorption data to the skewed reference absorption data in a time domain. Additionally or alternatively, in some embodiments, obtaining reference absorption data includes obtaining reference absorption data indicative of basis sets measured at a scan rate that satisfies a predefined threshold.

In some embodiments of the method, obtaining reference absorption data includes obtaining data indicative of basis sets measured at a scan rate that produces an amount of skew that is less than a reference amount of skew. Fitting the measured absorption data, in some embodiments of the method, may include removing an effect of an electronics response from the measured absorption data. In some embodiments, obtaining the measured absorption data includes directing light through the sample gas and measuring the amount of absorption of the light by the same gas while adjusting the frequency through a predefined range of frequencies.

Obtaining the measured absorption data, in some embodiments, includes directing laser light through the sample gas in a cavity having mirrors at opposite ends of the cavity to reflect the laser light within the cavity. In some embodiments of the method, obtaining the measured absorption data includes directing light through natural gas. The method may additionally or alternatively include measuring the amount of absorption of light by the sample gas during a ramp period in which an intensity of the light changes. In some embodiments, the method includes measuring the amount of absorption of light by the sample gas during a ringdown period in which a source of the light is deactivated. Further, in some embodiments, the method includes deactivating the source of the light at a frequency at which a negligible amount of light absorption occurs.

In another aspect of the present disclosure, one or more machine-readable storage media may include a plurality of instructions stored thereon that, in response to being executed, cause a compute device to obtain measured absorption data indicative of an amount of absorption of light by a sample gas at each of multiple frequencies. The instructions may also cause the compute device to determine an absorption dependent cavity time constant indicative of a skew to the measured absorption data caused by light reflections within a cavity in which the sample gas is contained. Additionally, the instructions may cause the compute device to obtain reference absorption data including basis sets indicative of reference amounts of light absorbed by each of multiple gases at each of the multiple frequencies. Further, the instructions may cause the compute device to skew the reference absorption data based on the absorption dependent cavity time constant to generate skewed reference absorption data. Additionally, the instructions may cause the compute device to fit the measured absorption data to the skewed reference absorption data to identify an amount of at least one constituent gas within the sample gas.

In some embodiments, the instructions may cause the compute device to obtain the reference absorption data by obtaining a linear combination of basis sets. The instructions, in some embodiments, may cause the compute device to obtain reference absorption data that additionally includes at least one line set. In some embodiments, the instructions may cause the compute device to determine an effect of at least one of external cavity gas absorption, broadband gas absorption, or etalons on the measured data. In some embodiments, the instructions may cause the compute device to perform analytical Jacobian decomposition. In some embodiments, the instructions may cause the compute device to determine an effect of collision broadening on one or more basis sets or a combination of higher order derivatives of basis sets.

The instructions, in some embodiments, may cause the compute device to purge the cavity with a purge gas and measure a light intensity and an empty cavity ringdown in the purged cavity before obtaining the measured absorption data. In some embodiments, fitting the measured absorption data, includes fitting the measured absorption data to the skewed reference absorption data in a time domain. Additionally or alternatively, in some embodiments, the instructions may cause the compute device to obtain reference absorption data indicative of basis sets measured at a scan rate that satisfies a predefined threshold.

In some embodiments, the instructions may cause the compute device to obtain data indicative of basis sets measured at a scan rate that produces an amount of skew that is less than a reference amount of skew. Fitting the measured absorption data, in some embodiments, may include removing an effect of an electronics response from the measured absorption data. In some embodiments, the instructions may cause the compute device to direct light through the sample gas and measure the amount of absorption of the light by the same gas while adjusting the frequency through a predefined range of frequencies.

In some embodiments, the instructions may cause the compute device to direct laser light through the sample gas in a cavity having mirrors at opposite ends of the cavity to reflect the laser light within the cavity. In some embodiments, the instructions may cause the compute device to direct light through natural gas. The instructions may cause the compute device to measure the amount of absorption of light by the sample gas during a ramp period in which an intensity of the light changes. In some embodiments, the instructions cause the compute device to measure the amount of absorption of light by the sample gas during a ringdown period in which a source of the light is deactivated. Further, in some embodiments, the instructions may cause the compute device to deactivate the source of the light at a frequency at which a negligible amount of light absorption occurs.

In yet another aspect of the present disclosure, a system may include a compute device with circuitry. The circuitry may be configured to obtain measured absorption data indicative of an amount of absorption of light by a sample gas at each of multiple frequencies. The circuitry may also be configured to determine an absorption dependent cavity time constant indicative of a skew to the measured absorption data caused by light reflections within a cavity in which the sample gas is contained. Additionally, the circuity may be configured to obtain reference absorption data including basis sets indicative of reference amounts of light absorbed by each of multiple gases at each of the multiple frequencies. Further, the circuitry may be configured to skew the reference absorption data based on the absorption dependent cavity time constant to generate skewed reference absorption data. In addition, the circuitry may be configured to fit the measured absorption data to the skewed reference absorption data to identify an amount of at least one constituent gas within the sample gas.

In some embodiments, the circuitry may be configured to obtain the reference absorption data by obtaining a linear combination of basis sets. The circuitry of the system, in some embodiments, may be configured to obtain reference absorption data that additionally includes at least one line set. In some embodiments, the circuitry may be further configured to determine an effect of at least one of external cavity gas absorption, broadband gas absorption, or etalons on the measured data. In some embodiments, the circuitry may be configured such that skewing the reference absorption data includes performing analytical Jacobian decomposition. In some embodiments, the circuitry may be additionally configured to determine an effect of collision broadening on one or more basis sets or a combination of higher order derivatives of basis sets.

The circuitry of the system, in some embodiments, may be configured to purge the cavity with a purge gas and measure a light intensity and an empty cavity ringdown in the purged cavity before obtaining the measured absorption data. Fitting the measured absorption data, in some embodiments of the system, includes fitting the measured absorption data to the skewed reference absorption data in a time domain. Additionally or alternatively, in some embodiments, the circuitry may be configured such that obtaining reference absorption data includes obtaining reference absorption data indicative of basis sets measured at a scan rate that satisfies a predefined threshold.

In some embodiments of the system, the circuitry may be configured to obtain data indicative of basis sets measured at a scan rate that produces an amount of skew that is less than a reference amount of skew. Fitting the measured absorption data, in some embodiments, may include removing an effect of an electronics response from the measured absorption data. In some embodiments, the circuitry may be configured such that obtaining the measured absorption data includes directing light through the sample gas and measuring the amount of absorption of the light by the same gas while adjusting the frequency through a predefined range of frequencies.

In some embodiments, the circuitry may be configured such that obtaining the measured absorption data includes directing laser light through the sample gas in a cavity having mirrors at opposite ends of the cavity to reflect the laser light within the cavity. In some embodiments of the system, the circuitry may be configured such that obtaining the measured absorption data includes directing light through natural gas. The circuitry of the system may additionally or alternatively be configured to measure the amount of absorption of light by the sample gas during a ramp period in which an intensity of the light changes. In some embodiments, the circuitry is configured to measure the amount of absorption of light by the sample gas during a ringdown period in which a source of the light is deactivated. Further, in some embodiments, the circuitry may be configured to deactivate the source of the light at a frequency at which a negligible amount of light absorption occurs.

In still another aspect of the present disclosure, any of the methods, machine-readable storage media, and systems disclosed above may utilize reference absorption data including line sets (rather than basis sets) indicative of reference amounts of light absorbed by each of multiple gases at each of the multiple frequencies.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
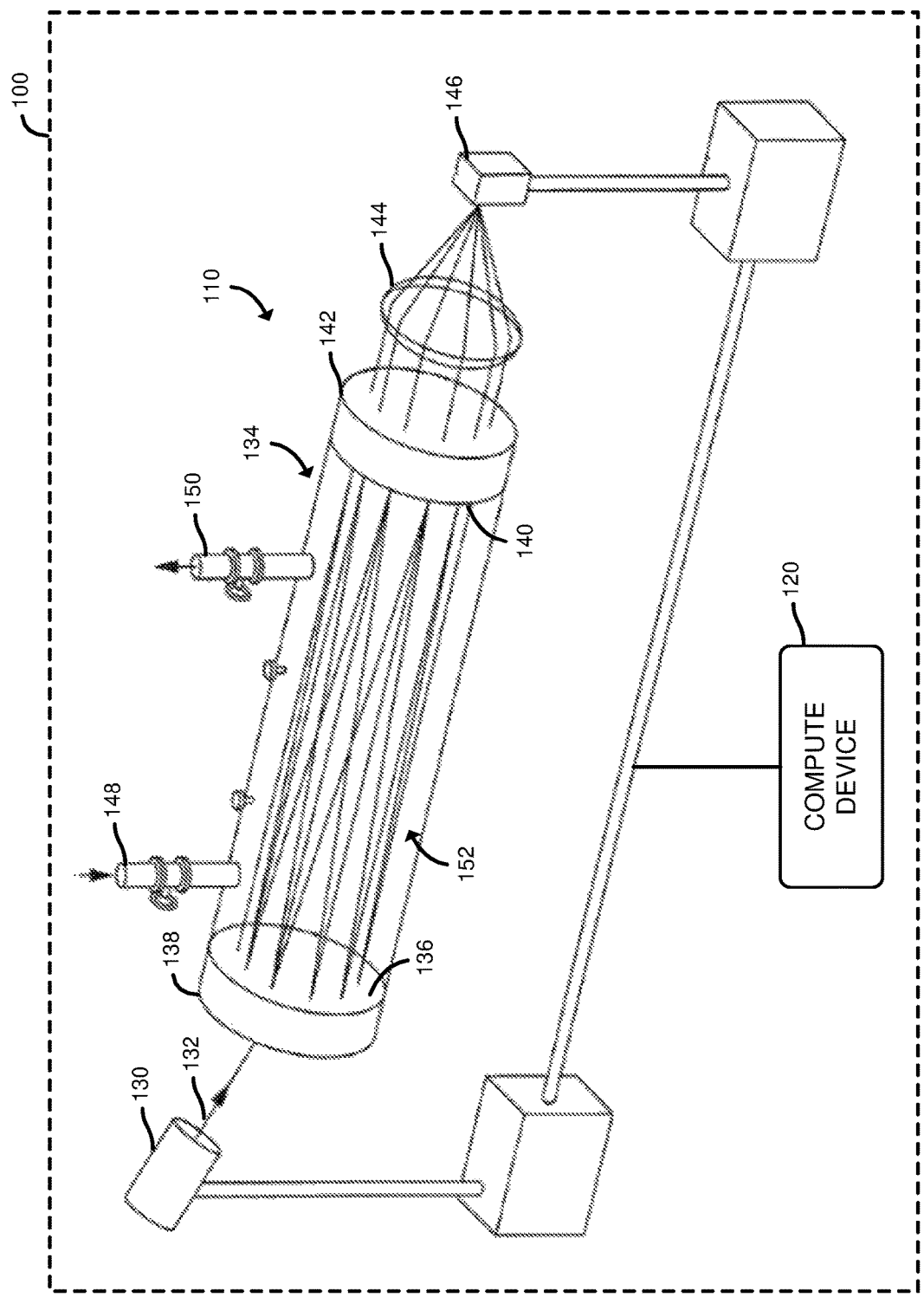
FIG. 1 is a simplified diagram of at least one embodiment of an integrated cavity output spectroscopy (ICOS) system for skewed basis set and/or line set fitting.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for skewed basis set fitting includes an absorption measurement device 110 and a compute device 120 communicatively connected to the absorption measurement device 110. The absorption measurement device 110, in the illustrative embodiment, is an off-axis integrated cavity output spectroscopy device (OA-ICOS). The absorption measurement device 110 includes a light source 130, which may be embodied as any device (e.g., a laser such as a direct near infrared distributed feedback laser, an interband cascade laser, or a quantum cascade laser, a light emitting diode, etc.) capable of radiating light 132 through a range of selected frequencies and into a cavity 152 defined in a chamber 134 having mirrors 136, 140 located at opposite ends 138, 142 of the chamber 134. In operation, the light 132 directed into the cavity 152 reflects off the mirrors multiple times, while a portion of the light 132 passes through the mirror 140 and is focused through a lens 144 and received by a detector device 146. The detector device 146 may be embodied as any device (e.g., a charge-coupled device, a photodiode, or other photodetector) configured to convert received light into an electrical signal indicative of an intensity of the received light. A gas (e.g., a sample gas containing a mixture of constituent of component gases) may be introduced into the cavity 152 through an inlet 148 and may be removed from the cavity 152 through an outlet 150. By measuring the received intensity (e.g., at the detector device 146) of the light 132 as it passes through the gas within the cavity 152 over a range of frequencies, reductions in the amount of received light (e.g., due to absorption by a particular constituent gas within the sample gas) at particular frequencies may be used (e.g., by the compute device 120) to identify the presence and amount (e.g., concentration) of the constituent gas(es), as described in more detail herein.

Given that the light 132 reflects across the length of the cavity 152 multiple times as the frequency of the light 132 is adjusted (e.g., by the light source 130), a skewing effect occurs on the measured light intensities (e.g., received at the detector device 146). The skewing effect on the received light (e.g., at the detector device 146) is dependent not only on the length of the cavity but also on the changing amount of absorption of light by the sample gas as the light sweeps through a range of frequencies. As such, and unlike typical systems, the system 100 in the illustrative embodiment determines and applies an absorption dependent cavity time constant model to basis spectra to skew the basis spectra to match the skew occurring within the absorption measurement device 110, thereby enabling the system 100 to identify and quantify the constituent gases within a sample gas, even when the sample gas has highly complex spectra (e.g., having spectra of sufficient complexity to rule out the exclusive use of line set fitting), such as a natural gas.

Figure 2:
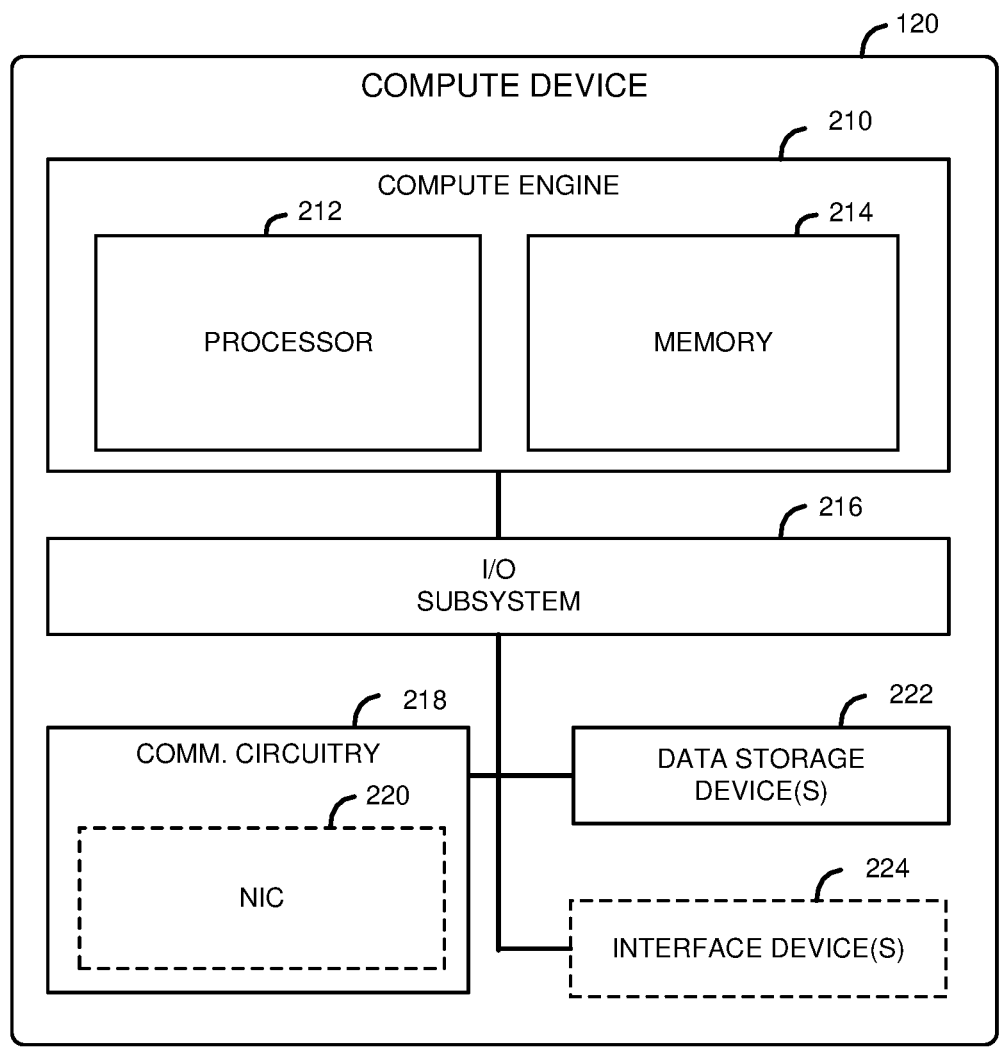
FIG. 2 is a simplified block diagram of at least one embodiment of a compute device of the system of FIG. 1.

Referring now to FIG. 2, the illustrative compute device 120 includes a compute engine 210, an input/output (I/O) subsystem 216, communication circuitry 218, a data storage subsystem 222, and one or more interface devices 224. Of course, in other embodiments, the compute device 120 may include other or additional components, such as those commonly found in a computer. Additionally, in some embodiments, one or more of the illustrative components may be incorporated in, or otherwise form a portion of, another component.

The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. Additionally, in some embodiments, the compute engine 210 includes or is embodied as a processor 212 and a memory 214. The processor 212 may be embodied as any type of processor capable of performing the functions described herein. For example, the processor 212 may be embodied as a single or multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. In some embodiments, all or a portion of the main memory 214 may be integrated into the processor 212. In operation, the main memory 214 may store various software and data used during operation such as frequencies ranges through which the light source 130 should emit light, measured intensities of light at each of the frequencies in the ranges (e.g., measurement data received by the detector device 146), reference absorption data (e.g., basis sets, line sets, and/or other data indicative of reference amounts of light absorbed by gases at different frequencies), absorption dependent cavity time constants, determined amounts of constituent gases within a sample gas, applications, programs, libraries, and drivers.

The compute engine 210 is communicatively coupled to other components of the compute device 120 via the I/O subsystem 216, which may be embodied as circuitry and/or components to facilitate input/output operations with the compute engine 210 (e.g., with the processor 212 and the main memory 214) and other components of the compute device 120. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the compute device 120, into the compute engine 210.

The communication circuitry 218 may be embodied as any communication circuit, device, or collection thereof, capable of enabling communications over a communication link between the compute device 120 and another device (e.g., the absorption measurement device 110, another compute device, etc.). The communication circuitry 218 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 218 may include a network interface controller (NIC) 220. The NIC 220 may be embodied as one or more add-in-boards, daughter cards, network interface cards, controller chips, chipsets, or other devices that may be used by the compute device 120 to connect with another device (e.g., the absorption measurement device 110, another compute device, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the compute device 120 at the board level, socket level, chip level, and/or other levels.

Each data storage device 222, may be embodied as any type of device configured for short-term or long-term storage of data such as, for example, memory devices and circuits, memory cards, hard disk drives, solid-state drives, or other data storage device. Each data storage device 222 may include a system partition that stores data and firmware code for the data storage device 222 and one or more operating system partitions that store data files and executables for operating systems. The compute device 120 may also include one or more interface device(s) 224, which may be embodied as any devices configured to enable the compute device 120 to provide information to or obtain information from a user of the compute device 120. As such, the interface device(s) 224 may include one or more output devices for providing visual or audible information, such as a visual display (e.g., a liquid crystal display (LCD), a light emitting diode (LED) display, etc.), and/or one or more speakers, and/or one or more input devices for receiving information from a user such as a microphone, a touch screen, physical buttons (e.g., on a keyboard or mouse).

Referring back to FIG. 1, off-axis integrated cavity output spectroscopy (OA-ICOS) is a powerful tool for the detection and quantification of trace optical absorbers. Most OA-ICOS analyzers operate in a regime where the influence of the time response of the cavity on the transmitted intensity spectrum cannot be neglected (e.g., the influence may cause incorrect quantification of constituent gases within a sample gas). Furthermore, some gases with broadband spectral absorption may present few or no distinctive spectral features, while modifying significantly the time response of the cavity (e.g., the cavity 152). Typical estimation models do not account for this line-shape skewing effect, or some models apply only a fixed correction. Failing to accurately model the time response of the OA-ICOS cavity can lead to inaccuracies and cross-interference errors. As mentioned above, the system 100, by contrast, takes into account the absorption dependent cavity time response to accurately quantify target gases over a large dynamic range in the presence of widely varying gas matrix composition with minimal or negligible cross-interference. As such, the system 100 enables achieving market specifications for applications covering a wide composition range of complex gas matrices, especially applications with broadband absorbers and/or complex spectral signatures requiring measured basis sets, such as hydrocarbon gas matrices. Furthermore, the operations carried out by the system 100 (e.g., by the compute device 120) to perform skewed basis set fitting reduces or eliminates extensive factory calibration that may otherwise be required for optical analyzers covering narrow composition ranges of complex gas matrices.

Cavity enhanced absorption spectroscopy (CEAS) is widely used to quantify trace gases or isotopic ratios, finding applications in environmental science, industrial process control, medical, national defense and other domains. Generically, CEAS uses two or more high reflectivity mirrors to trap light in a sample cavity (e.g., the mirrors 136, 140 at opposite ends 138, 142 of the cavity 152). The light is reflected back and forth within the cavity (e.g., the cavity 152), travelling a relatively long effective path length and increasing the interaction path length between light and matter (e.g., gas). In this way, the optical absorption of weakly absorbing gas can be detected and used to quantify very low gas concentrations or weakly absorbing gases.

There are currently two dominant methods of CEAS: cavity ringdown spectroscopy (CRDS) and integrated cavity output spectroscopy (ICOS). CRDS is a first generation CEAS method where light is injected into the cavity and then the light source, typically a laser or LED, is abruptly deactivated. After the light source is deactivated, the light within the cavity begins to leak out from either absorption, scattering, or transmission in the gas and at the mirror surfaces. The decay follows an exponential form and is known as the ringdown (RD). The time constant of the exponential decay is denoted by τ_CRDS and can be calculated from Equation 1, as follows:

$$\tau_{CRDS} \equiv \frac{L}{c(1-R+\alpha L)} \qquad \text{Equation 1}$$

In Equation 1, L is the cavity length, R is the mirror reflectivity, c is the speed of light and α is the gas absorption per unit length.

Figure 3:
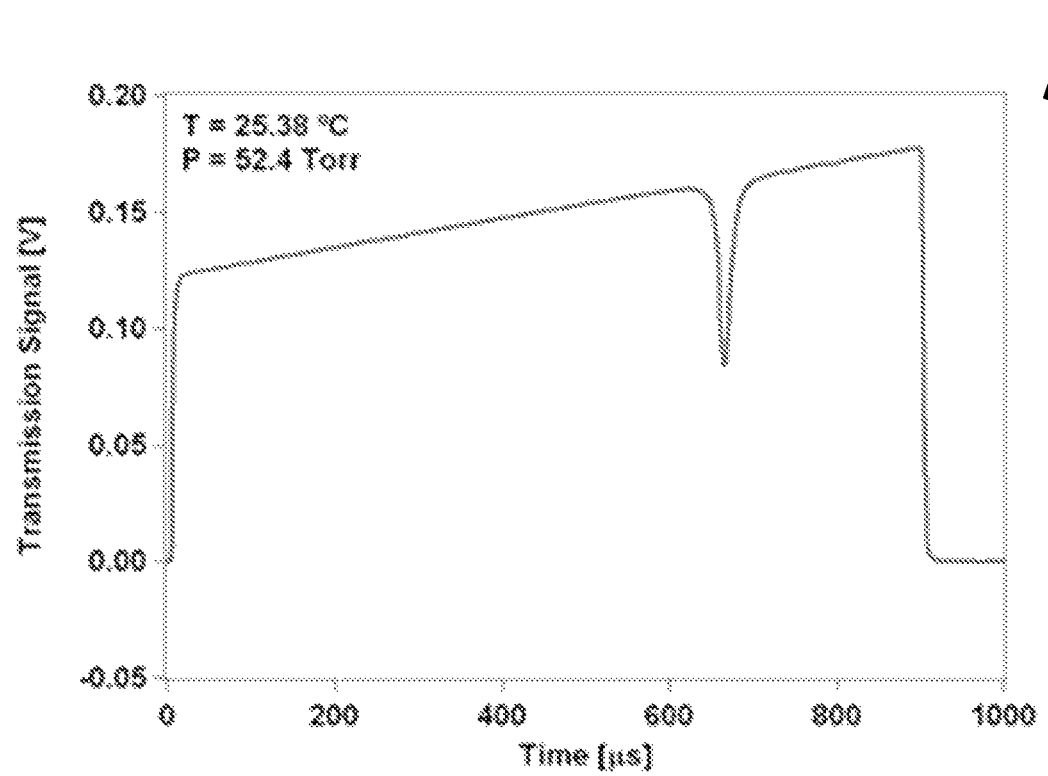
FIG. 3 is a chart of a transmission signal over time that may be produced using an integrated cavity output spectroscopy (ICOS) system.

ICOS, and more specifically OA-ICOS, is the other commonly used CEAS. In ICOS systems, instead of deactivating the laser abruptly to measure absorption at a single wavelength as with CRDS, the laser is tuned across a wavelength region of interest at a rate slow enough that the light passing through the cavity reaches a pseudo-steady state and the power transmission through the cavity is measured. When the laser wavelength passes over an optical absorber, the transmitted light decreases. A chart 300 of a transmission signal over time that may be produced using an integrated cavity output spectroscopy (ICOS) system is illustrated in FIG. 3.

Interference between transverse electromagnetic (TEM) modes is suppressed in OA-ICOS systems by sourcing light off-axis, into a relatively large number of higher order transverse modes resulting in a washing out of mode noise interference both in the ICOS signal and in the ringdown at the end of the trace. Typically, the laser is deactivated abruptly at the end of the laser wavelength scan in order to measure its ringdown time constant and calibrate the effective path length of the cavity.

By measuring the light intensity in the absence of an absorber ($I_o$) and with an absorber (I), the absorption coefficient may be calculated, as follows in Equation 2:

$$\frac{\Delta I}{I_o} = \frac{I_o - I}{I_o} \approx \frac{GA}{1+GA} \qquad \text{Equation 2}$$

In Equation 2, A=αL is the cavity single pass absorption and G is the cavity gain. In most implementations of ICOS, the ringdown at the end of the trace is used to measure the reflectivity R of the mirrors and thus determine the effective path length $L_{eff}$ of the cavity. It can be shown that GA is the effective absorption coefficient considering the effective path length that is generated by cavity enhancement, as follows in Equation 3:

$$GA = \alpha L_{eff} \qquad \text{Equation 3}$$

Gas concentration can be related to GA by first principles using spectroscopic parameters such as those available in the high-resolution transmission molecular absorption database (HITRAN) database, and from the measurement of pressure, temperature, and the mirrors' reflectivity. It is also possible to estimate the concentration of the constituents of a measured GA spectrum by scaling and combining previously measured GA spectra of single components or mixtures with known concentrations. The computation is valid only if GA scales linearly with concentration. The previously measured GA spectra are referred to as basis sets and may represent a single gas or a mixture of gases. The technique is especially useful for measuring gases in a complex mixture with many overlapping spectral features where a model based on spectroscopic parameters is not well suited, although it is not limited to these complex cases. A linear combination of multiple basis sets can be used to determine the concentrations of many gases simultaneously. It is also possible to combine basis sets with spectroscopic parameters from other gases, referred to as line sets, to provide more flexibility and accuracy in the modeling.

As indicated above, one complication that must be accounted for is that the ICOS cavity (e.g., the cavity 152 in FIG. 1) has an absorption dependent cavity time response that acts in first approximation as a low pass filter. The light from the light source (e.g., the light source 130, which may be a laser) enters the cavity 152 and reflects back and forth between the mirrors (e.g., the mirrors 136, 140). At each reflection, a small fraction of the light within the cavity 152 is transmitted through the mirror (e.g., the mirror 140) and measured by the detector (e.g., the detector device 146). Thus, the light at a specific frequency enters the cavity at a specific time but exits the cavity at multiple distinct times associated with each of the back and forth reflections. Therefore, when the laser is turned off abruptly, the light intensity reaching the detector (e.g., the detector device 146) decays exponentially. In the same way, since the laser frequency is scanned in time, the light reaching the detector (e.g., the detector device 146) at a given time is composed of more than one frequency. Since gas absorption is a function of frequency, this cavity time response results in skewed absorption features. This skew effect increases as the ringdown time and/or scan rate increases and is inversely proportional to the gas absorption.

Figure 4:
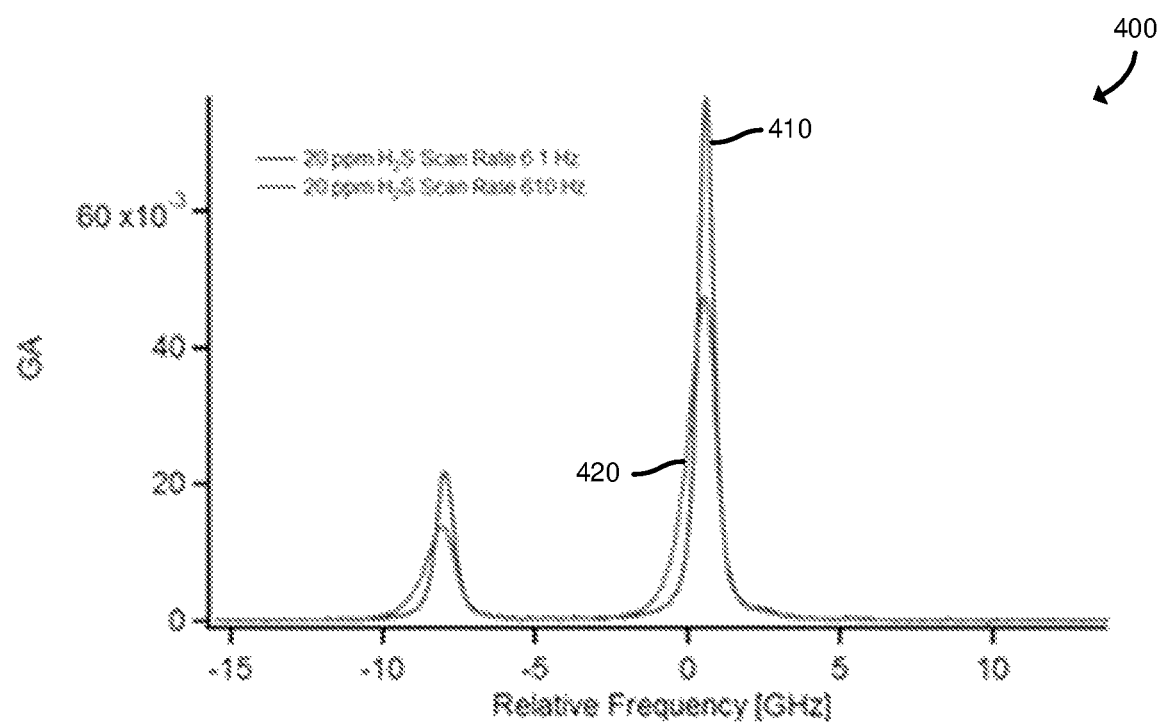
FIG. 4 is a chart of gas absorptions over a range of frequencies using two different scan rates.

Referring now to FIG. 4, a chart 400 illustrates the difference between measuring gas lines at an impractically slow scan rate (e.g., 6.1 Hz or spectrum measurements per second) where there is no skew apparent, as represented in plot 410, and measuring the same absorber at a much faster scan rate (e.g., 610 Hz) as represented in plot 420. The skew effect resulting from measuring the absorber at the higher scan rate necessitates a fitting algorithm that includes the absorption dependent time response of the cavity (e.g., the cavity 152).

The technique of using a linear combination of basis sets to measure a target species in a complex spectrum is useful for many industrial applications where the absorption features of gas constituents (e.g., hydrocarbons) overlap, and the absorption magnitudes vary dramatically. One example application is for the measurement of $H_2S$ in natural gas. Companies that produce natural gas often must monitor and/or remove contaminants, and the natural gas must be characterized before it is introduced into pipelines.

Figure 5:
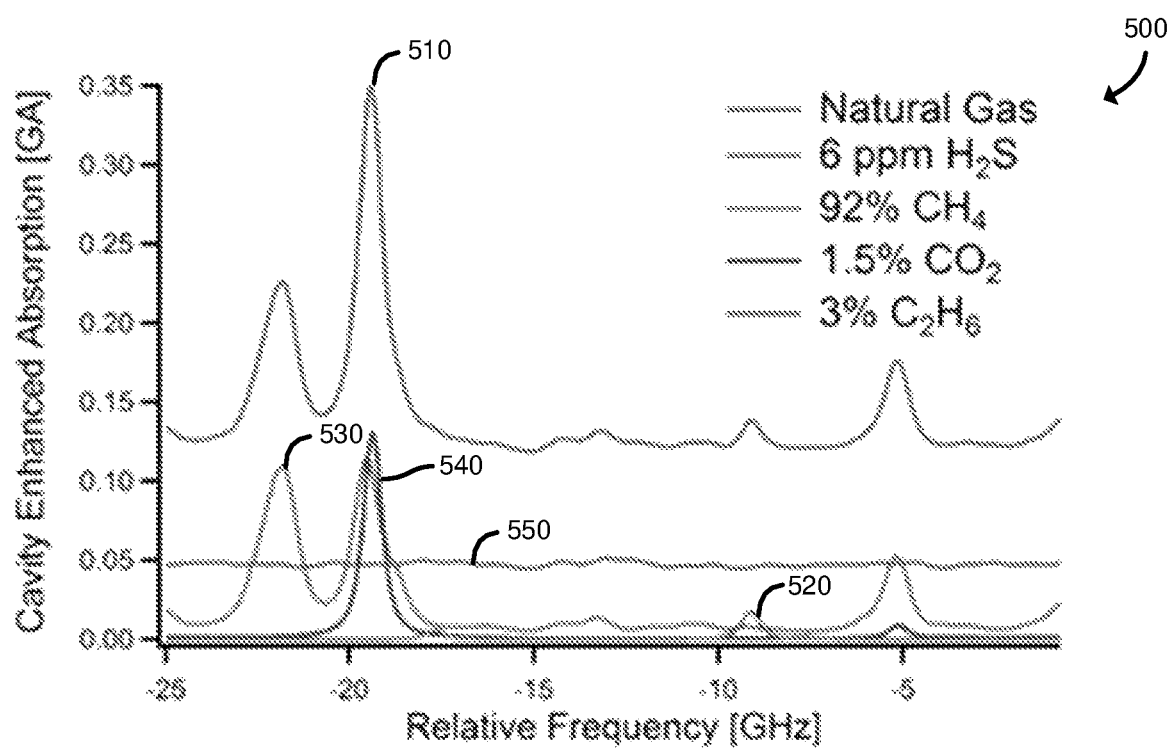
FIG. 5 is a chart of an absorption spectrum of a natural gas mixture with basis sets for each component scaled to fit the absorption spectrum of the natural gas mixture.
Figure 6:
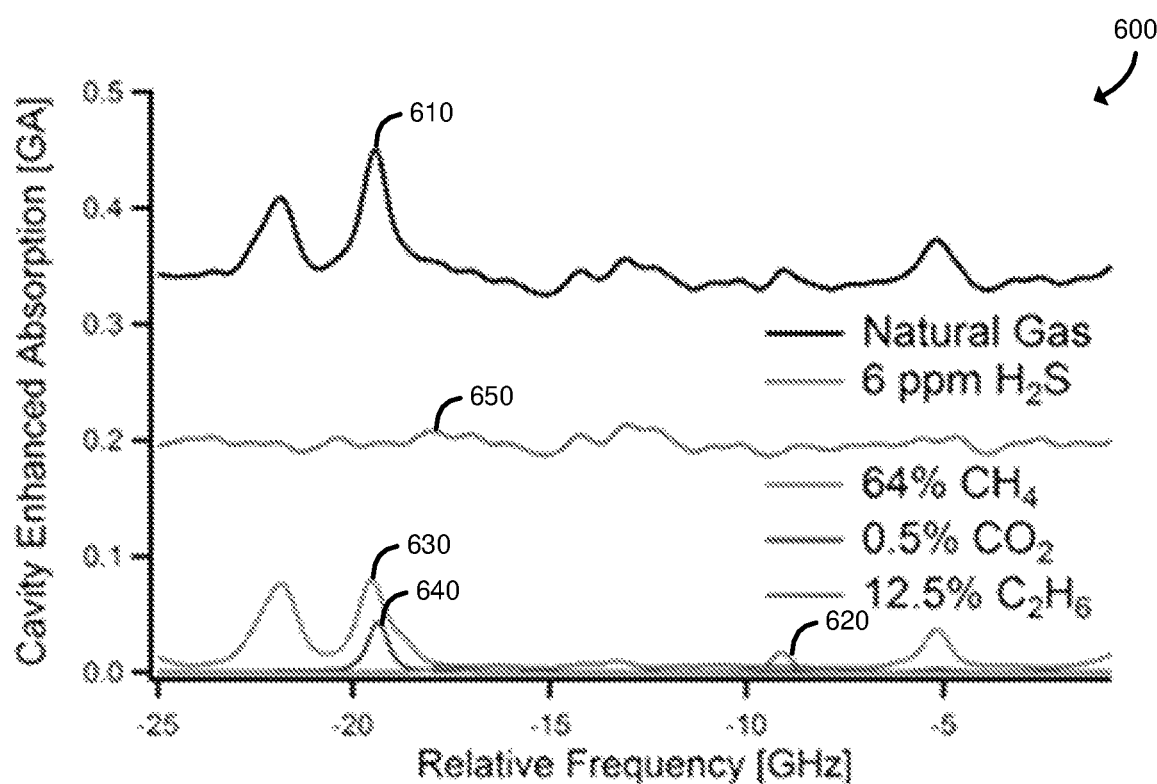
FIG. 6 is a chart of an absorption spectrum of a natural gas mixture with basis sets for each component scaled to fit the absorption spectrum of the natural gas mixture.

Referring now to FIG. 5, a chart 500 illustrates an absorption spectrum 510 of a natural gas mixture with the basis sets 520, 530, 540, 550 that are used to characterize the gas. In FIG. 6, a chart 600 illustrates another absorption spectrum 610 of a natural gas mixture that contains less methane, more ethane and other hydrocarbons, and the same amount of $H_2S$. The challenge is to determine trace concentrations of $H_2S$ (i.e., represented by plot 620), as well as the concentration of part of the other the components 630, 640, 650, considering significant changes in the relative concentration of the gas mixture.

Although the absorption dependent time response of an ICOS cavity has been modeled and successfully applied to individual absorption lines computed from spectroscopic parameters available in the HITRAN database, there are multiple challenges remaining in implementing this model for numerous ICOS applications, such as applications with complex gas matrices or broadband gas absorbers. First, some gases might not have known spectroscopic parameters in the wavelength range of the ICOS analyzer and/or have a large number of spectral features. For such cases, one practical solution is to rely on measured reference spectra, called basis sets, to model the absorption. However, accurate modeling of basis sets for the calculation of absorption dependent time response is not performed in conventional systems.

Additionally, the equation for modeling the absorption dependent time response of the ICOS cavity requires a large number of mathematical operations, especially in the context of iterative optimization. The model can be assimilated to the convolution of an input signal and a kernel, which kernel is changing at every point of the convolution in a way that is dependent on the input signal. This expensive convolution-like operation must also be applied to model derivatives in the optimization process, making the operation impractical for resource constrained embedded systems.

Further, in some applications, one or many gas constituents have broadband absorption spectra with few or no characteristic features in the spectral range of the ICOS analyzer, while their concentrations may vary over time. This broadband absorption, although not discernable on the spectra, has a significant impact on absorption dependent time response of the ICOS cavity and on the modeling of the other gas constituents with discernable spectral features. Some cavity losses caused by scattering or cavity walls can also be modeled as broadband absorption.

In some applications, ambient air constituents such as $H_2O$ or $O_2$ present within the ICOS analyzer may absorb part of the light reaching the detector and add non-negligible spectral features to the measured spectra. These external cavity gases must be modeled properly and accounted for in the modeling of the absorption dependent time response of the ICOS cavity. However, their effect on the spectrum cannot be modeled equivalently to cavity gas effect. Another challenge related to basis sets, but also present with line sets, is the modeling of collision broadening of absorption lines that varies with the composition of a gas matrix in which a gas constituent is present. For example, the line width and line height of $H_2S$ at a given concentration will change significantly if the gas matrix is constituted of nitrogen versus methane due to collision broadening dependency on the nature of surrounding molecules. Since basis sets for individual gas constituents are preferably measured with a non-absorbing gas matrix in the spectral range of interest, the spectral features of the basis sets may not have the proper broadening and height for use with a different gas matrix. The gas matrix composition, and therefore the effective collision broadening, may also vary over time for a given application. This problem has heretofore not been solved for basis sets.

The accurate modeling of the absorption dependent time response of the ICOS cavity significantly improves the linearity of the model, especially when measuring strong absorption features. When strong absorption features are modeled, offsets on the measurement may be caused by voltage or current biases. Compensating for or modeling measurement offsets in the context of an accurate modeling of absorption dependent time response of the ICOS cavity is not performed in previous (i.e., conventional) systems. Additionally, the modeling of the absorption dependent time response of the ICOS cavity should account properly for other time dependent phenomena that modify the measured spectra. Other time dependent phenomena include the time response of the acquisition electronics and detector, and the equivalent time response of numerical filtering applied to measured spectra. Previous (e.g., conventional) systems do not accurately combine the absorption dependent time response of the ICOS cavity with other time dependent phenomena modifying the measurements.

One strategy to calibrate the effective path length of the cavity is to measure the ringdown time when the laser is deactivated abruptly. The precise and periodic measurement of the effective path length of the cavity provides more accurate gas estimation and more robust analyzers. Typically, the deactivation point is selected for a laser frequency (wavelength) where there is no gas absorption, in order to measure the empty cavity ringdown time constant. However, in complex applications, it is not possible to find a laser frequency within the spectral range of the analyzer where there is no gas absorption. The gas absorption at the laser turn off point can be caused by gas spectral lines and/or broadband absorption. Previous (e.g., conventional) systems do not model the absorption dependent time response of the ICOS cavity in combination with the ringdown measurement for varying gas absorption at the ringdown measurement frequency.

Furthermore, parasitic light or light interferences is a well-known issue of CEAS methods. The issue creates periodic spectral signatures in the measured spectra, of shape similar to sinewaves, which amplitude, period, and phase depends on the conditions generating the parasitic light. The associated spectral signatures are often referred to as etalons. These interferences are addressed in multiple ways such as vibrating the cavity with piezo-electric transducers to average out the interfering conditions. In some applications it is not possible to completely eliminate the interferences because the source of the parasitic signal cannot be removed, or apparatuses such piezo-electric transducers cannot be used in some environments due to cost or safety reasons. In such cases, one solution consists of adding etalon signatures in the modeling parameters of the spectra to reduce the influence of the etalon on the estimation of gas concentrations. Previous (e.g., conventional) systems do not accurately combine an etalon model with the modeling of absorption dependent time response of the ICOS cavity.

The issues described above may prevent ICOS analyzers from achieving required market specifications such as accuracy, linearity and cross-interferences for applications covering a wide range of complex gas matrices, especially applications with broadband absorbers and/or complex spectral signatures requiring measured basis sets. In some of those applications, an ICOS analyzer may achieve specifications, but the calibration will hold only for a narrow range of gas compositions specific to a customer process and may require extensive calibration at the factory or at analyzer field location. Overcoming those challenges will allow ICOS technology to achieve new applications where other competing optical technologies suffer from cross-interference and accuracy limitations.

Figure 7:
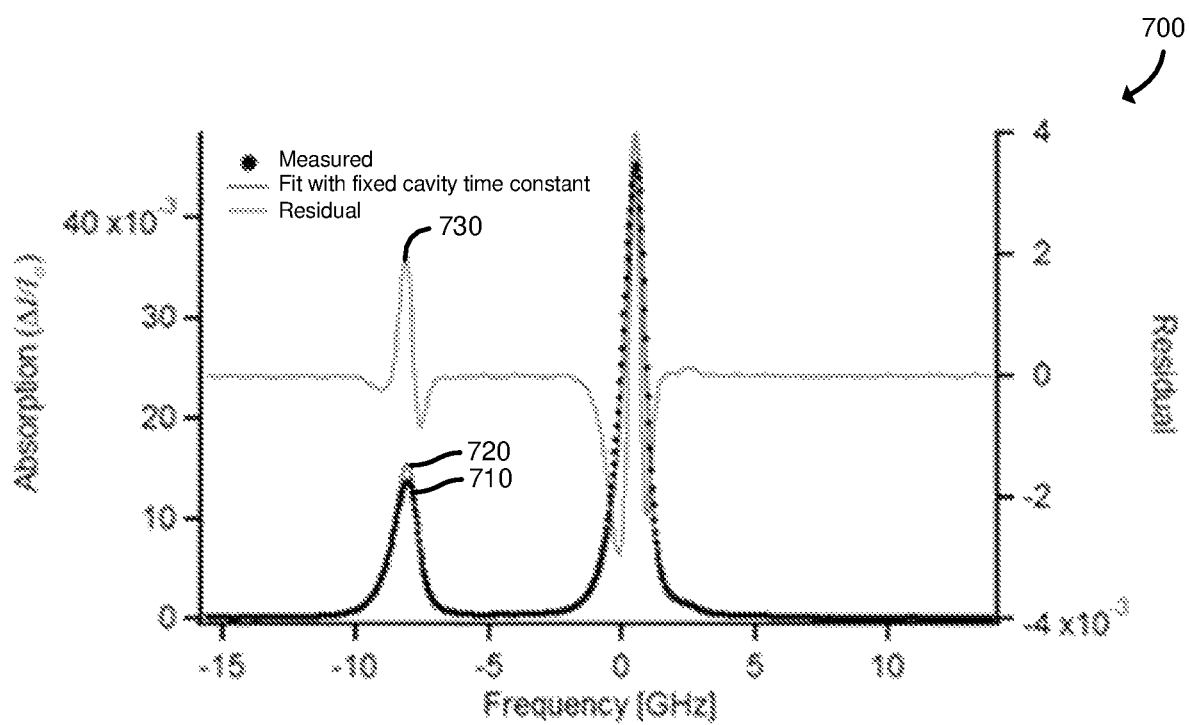
FIG. 7 is a chart of measured absorption of 20 ppm $H_2S$ fit with a basis set, measured at 200 ppm, after being skewed with a fixed cavity time constant algorithm.

Two previous methods to attenuate the impact of absorption dependent time response of the ICOS cavity are described below. The methods, however, apply a fixed compensation of the time response of the cavity, where the absorption is assumed constant. The first method relies on basis sets measured at a slow scan rate, so that the skew effect is negligible. Then the basis sets are skewed using a fixed cavity time constant $\tau$. These skewed basis sets are then linearly combined to best fit the measured data. There are two problems with this approach. First, since the skew algorithm does not take into account the absorption dependency of the cavity time constant, the skewed basis set does not match accurately the measured spectra. The second problem is that skewed basis sets do not scale linearly with concentration. An example is shown in the chart 700 of FIG. 7, where a basis set 710 measured at 200 ppm $H_2S$ was skewed with the fixed cavity time constant algorithm (e.g., as shown in plot 720) and scaled to fit a measurement of 20 ppm $H_2S$ (e.g., as shown in plot 730). The residual between the fit and the measurement is almost 10% of the measured absorption. The error in this concentration measurement is 4.3%. The concentration error is less when fitting a measurement of 200 ppm $H_2S$ because there is no scaling required, however the incorrect algorithm still leads to an error of 0.24%.

Figure 8:
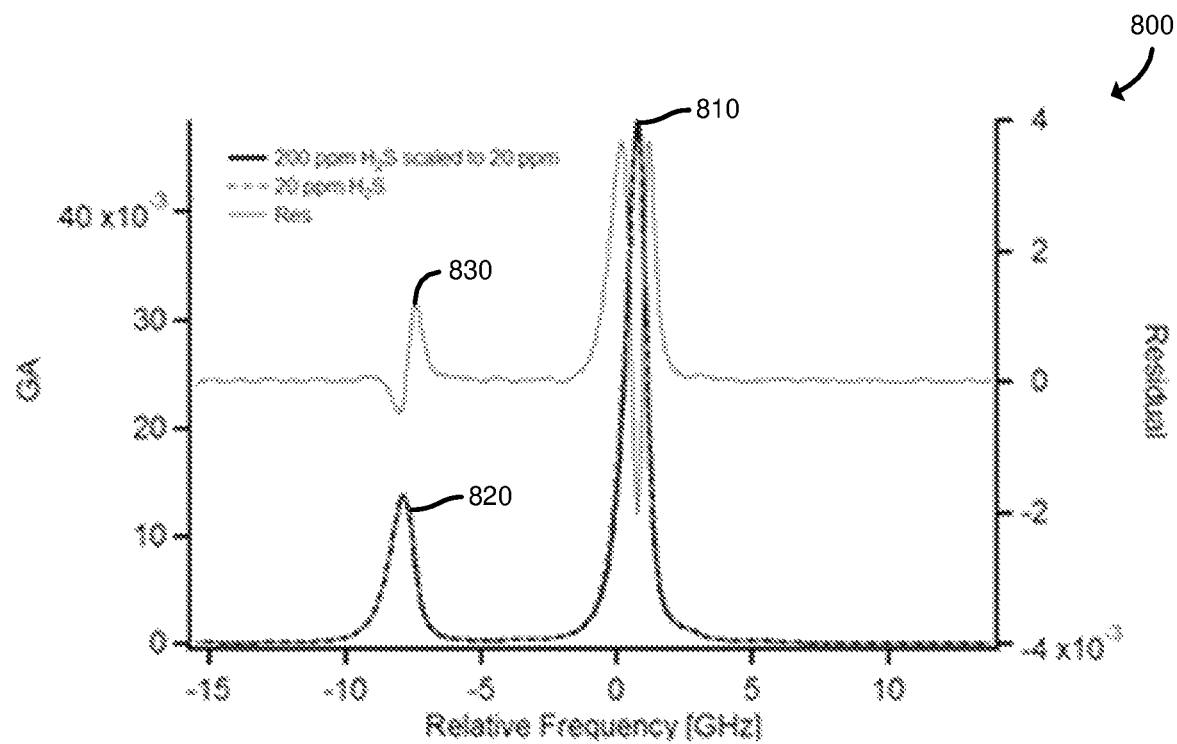
FIG. 8 is a chart of a measured skewed absorption spectrum at 610 Hz for 20 ppm $H_2S$ and 200 ppm $H_2S$ scaled to 20 ppm.

A second method relies on basis sets measured at the same scan rate as the instrument so that the basis sets are properly skewed. The skewed basis sets are then linearly combined to best fit the measured data. While this method does use properly skewed basis sets, the same problem exists when scaling is applied because the skewed basis sets do not scale linearly with concentration. FIG. 8 includes a chart 800 showing the disagreement between a measurement of 20 ppm $H_2S$ (e.g., plot 820) and a measurement of 200 ppm $H_2S$ scaled to 20 ppm (e.g., plot 810). The residual is shown as plot 830 in FIG. 8.

The system 100 described relative to FIG. 1 overcomes the challenges described above and includes multiple innovations, as follows. The ICOS measurement model, in the illustrative embodiment, accounts for multiple optical phenomena. Referring now to the chart 900 in FIG. 9, the measurement is composed of a first region called "ramp" 910 where the laser is on and its wavelength (frequency) is swept by tuning the current, and a second region, called the "ringdown" 930, starting at the moment the laser is turned off. The ramp 910 includes the laser intensity 916 coupled in the cavity (e.g., the cavity 152 of FIG. 1). The laser intensity 916 includes the wavelength dependency of the reflectivity of the mirrors (e.g., the mirrors 136, 140) as well as the coupling efficiency of the laser in the cavity (e.g., the cavity 152). Further, the ramp 910 includes gas absorption 918 of the laser light. The ramp 910 additionally includes external cavity absorption 914 from ambient gas outside the cavity (typically $H_2O$, $CO_2$ and $O_2$ at ambient pressure). Further, the ramp 910 includes broadband absorption 920 from cavity gas that has significant absorption but negligible spectral features (absorption lines) in the spectral range preventing discrimination of the gas. In addition, the ramp 910 includes etalons 912 from cavity modes and other parasitic reflections from optical elements within the laser beam path (e.g., collimator, detector, etc.).

The ringdown curve is the exponential decay of the light exiting the cavity 152 once the laser has been turned off. The time constant of the measured ringdown 938 may differ from the empty cavity ringdown time 936 (non-absorbing gas) due to broadband gas absorption 932 as well as spectral lines 934 of cavity gas at the turn-off wavelength. External cavity gas and etalons do not affect the measured ringdown time constant. Whenever possible, the laser is turned off at a wavelength free from absorption features. Another component common to both the ramp and the ringdown curve and not shown in the measurement model is the bias from a detector/preamplifier that offsets the measurement. In the illustrative embodiment, the system 100 (e.g., the compute device 120) removes the bias before processing the measurement (e.g., the measurement data).The absorption dependent time response of the cavity 152 is modeled and implemented accurately using basis sets measured at low scanning rate. The model can include basis sets only, or the combination of basis sets for some gas constituents and line sets for other gas constituents according to data available and the complexity of the constituents' spectra. The skewed light intensity can be modeled by including exponential decay terms that account for the evolution of the light within the cavity and integrating over all prior times. In reality, the ringdown time decreases with increasing absorption according to Equation 1. Since the absorption changes with time during the laser scan, the ringdown time is also a function of time. This absorption dependent cavity time constant is used to skew the model according to Equation 4 before fitting the measured data.

$$I(t) \approx \frac{T}{2R\tau_0} \int_{-\infty}^{t} I_0(t') e^{-(t-t')/\tau(t')} dt' \qquad \text{Equation 4}$$

The output intensity is multiplied by the mirror transmittance T explaining why only a small fraction of the laser intensity enters the cavity. The factor ½ accounts for the fact that the light exits equally both mirrors of the cavity. The empty cavity time constant $\tau_0$ normalizes the cavity impulse response such that an empty cavity does not absorb light. The formula includes the integration starting from time $-\infty$, which is not practical for a real-time analysis. Instead, the sum will start from a time that is an optimal multiple of $\tau_o$, before t such that the computation is efficient and has negligible difference when compared with longer summation time.

Figure 9:
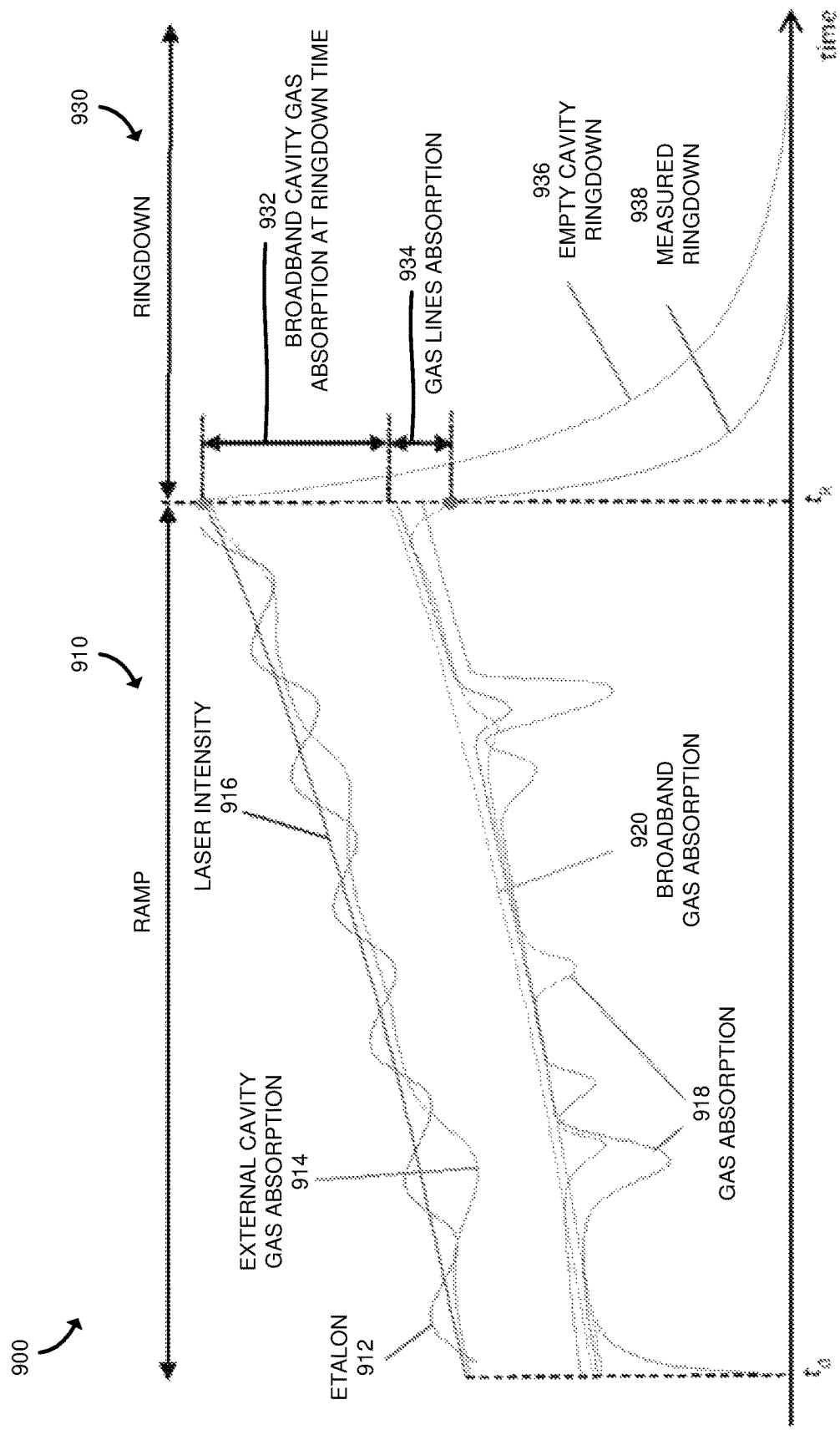
FIG. 9 is a chart of ICOS measurement features.

The time-dependent ICOS model is based on two main components: the baseline $\propto I_0(t')$ and ringdown $\tau(t')$ at each point of the measurement ramp. Referring to FIG. 9, those two quantities are modeled as:

Baseline=(Laser intensity 916+ΣEtalons 912)×exp
(ΣExternal cavity gas absorption 914)   Equation 5

Ringdown$^{-1}$=Empty cavity ringdown$^{-1}$ 936+c×ΣGas
absorption 918+Broadband gas absorption 920   Equation 6

However, the model is an ill-posed problem. A fitting algorithm cannot discriminate the laser intensity 916 in the baseline from broadband gas absorption 920 and empty cavity ringdown time 936 in the ringdown model. Since the broad absorption of the gas in the cavity 152 has a direct impact on the scaling of the absorption lines of target gases, in at least some embodiments, those features are quantified when analyzing the measurements, unless the gas matrix of the process is guaranteed to have no gas with broadband absorption within the spectral range of interest.

Laser intensity $\overset{?}{\leftrightarrow}$   Equation 7

Empty cavity ringdown$^{-1}$ + Broadband gas absorption

Therefore, in the illustrative embodiment, additional information is used for the fit to converge towards a valid solution. The measurable information can be (i) the measured ringdown time constant at laser turn-off point t'$_R$ 938 or (ii) the laser intensity 916 and empty cavity ringdown 936 measured with a purged cavity (separate measurement). Referring to the first type of measurable information (e.g., measured ringdown), the normal ICOS operation mode is based on measuring ringdown time at laser turn-off point t'$_R$. The ringdown time is measured at each scan. The contribution of the broadband gas absorption and empty cavity ringdown are estimated by the measured ringdown time constant:

Ringdown (t'$_R$)$^{-1}$=Empty cavity ringdown$^{-1}$+c×ΣGas
absorption(t'$_R$)+Broadband gas absorption   Equation 8

The ringdown function of the ramp becomes:

Ringdown$^{-1}$=Ringdown(t'$_R$)$^{-1}$+c×Σ(Gas absorption−
Gas absorption(t'$_R$))   Equation 9

The gas absorption at measured ringdown time t'$_R$ is accounted for, as well as the broadband absorption (implicitly), and the laser intensity becomes a fitting parameter.

An alternate operation mode of ICOS that may be used for solution development includes making a separate measurement with a purged cell for calibrating the analyzer over a short period of time (a few hours or days) depending on its environment. The cell can be purged with nitrogen, air, or gas mixture without broadband gas absorption. Both the laser intensity and the empty cavity ringdown time are measured with the purged cell and assumed constant for subsequent measurements with target gas samples. This assumption is often valid in laboratory conditions, although those parameters may vary with temperature and over time. In this operation mode, the broadband gas absorption is a fitting parameter, while the laser intensity and empty cavity ringdown time are constants.

The implementation of the time dependent equations in low cost embedded systems is now achievable with a new algorithm for the integration of the absorption dependent time response of the cavity 152 in an iterative optimization processes. The ICOS skew effect can be described as an integral function of the following form:

$$I(t) = \int_{-\infty}^{t} f(t')e^{-(t-t')g(t')}dt'$$   Equation 10

In the above function, the following relationships exist:

$$f(t') = \frac{T}{2\tau_0 R}I_0(t')$$   Equation 11

$$g(t') = \frac{1}{\tau(t')}$$   Equation 12

The Jacobian J of the skew model can be described in term of the Jacobian matrices J$_f$ and J$_g$ of $f(t)$ and g(t) respectively:

$$J_i(t) = \frac{\partial I(t)}{\partial x_i} = \int_{-\infty}^{t}\left[\frac{\partial f(t')}{\partial x_i} - (t-t')f(t')\frac{\partial g(t')}{\partial x_i}\right]e^{-(t-t')g(t')}dt'$$   Equation 13

$$J(t) = \int_{-\infty}^{t}[J_f(t') - (t-t')f(t')J_g(t')]e^{-(t-t')g(t')}dt'$$   Equation 14

Therefore, when discretizing the integrals, the same coefficients of intermediate exponential functions can be used for both the forward model and the Jacobian. The cost of computing the Jacobian of the skewed forward model is reduced by reusing the exponential coefficients. Further, the skew effect can be computed both on analytical or numerical Jacobian matrices J$_f$, and J$_g$.

Since the relationship between wavelength and time is not linear in typical ICOS implementations, in the illustrative embodiment, the system 100 (e.g., the compute device 120) performs the fit in the time domain to reduce the computation load of the skew effect and to improve accuracy. The main implication is to evaluate the un-skewed forward model functions $f(t)$ and g(t) and their Jacobians on a non-uniform wavelength grid matching the uniform time grid of the actual measurement.

Additionally, the absorption dependent time response of the cavity 152 is combined with the modeling of broadband absorption represented with basis sets, polynomial functions, or a scalar value in order to account for the significant impact of these absorbers on the absorption dependent time response of the cavity 152. Although such broadband absorbers may not display discernable spectral features, they modify significantly the time response of the cavity 152 and cannot be ignored to estimate accurately the concentration of the other gas constituents.

Further, when the absorption of ambient air constituents such as $H_2O$ or $O_2$ present within the ICOS analyzer (e.g. the absorption measurement device 110) add non-negligible spectral features to the measured spectra, they are modeled using basis sets or line sets and are included as light intensity features in the integration equation of the absorption dependent time response of the cavity 152. The external cavity gases are modeled as light intensity feature while the internal cavity gases are included through the absorption dependent time response. This difference in modeling provides a more accurate determination of gases concentration from the measured spectra and reduces cross-interferences due to ambient gas of the analyzer.

The effect of collision broadening on basis sets is included in the modeling using the second derivative of the basis sets, or the combination of even higher order derivatives (e.g., 2nd, 4th, 6th, etc.), as an optimization parameter. The second derivative can be implemented through various filtering techniques such as the Savitzky-Golay derivatives. The optimization of the scaling of the second order derivative of the basis sets minimizes spectral residuals by simulating the influence of the collision broadening on the basis sets. This correction reduces cross-interferences between gas constituents and provides a more accurate determination of gas concentrations from the measured spectra. Further, this approach allows for compensation for variations of gas matrix composition, or for compensation for the difference in the gas matrix used for basis sets determination and the gas matrix of the measured samples. Other transformations of the basis sets can be designed in order to achieve similar goals.

The accurate modeling of the absorption dependent time response of the ICOS cavity 152 significantly improves the linearity of the model, especially when measuring strong absorption features. When strong absorption features are modeled, a new optimization parameter (variable or fixed) is added to account for small offsets on the measurement that may be caused by voltage or current biases. This optimization parameter can reduce linearity deviations for gases with strong absorption lines or high gas concentration.

The modeling of absorption dependent time response of the ICOS cavity 152 can be combined with other time dependent phenomena that modify the measured spectra. Other time dependent phenomena include the time response of the acquisition electronics and detector (e.g., the detector device 146), and the time response of numerical filtering applied to measured spectra. In the illustrative embodiment, the system 100 (e.g., the compute device 120) accounts for the additional time response h(t) that is convolved with the skewed forward model:

$$I_h(t) = h(t) * \int_{-\infty}^{t} f(t')e^{-(t-t')g(t')}dt'$$

Equation 15

The above operation can be added afterward or even deconvolved from the measurement prior to fitting the model. Including this allows the optimization process to determine the gas concentrations more accurately and reduce cross-interferences.

As mentioned above, a strategy to calibrate the effective path length of the cavity is to measure the ringdown time when the laser is turned off abruptly. The accurate and periodic measurement of the effective path length of the cavity provides more accurate gas estimation and more robust analyzers. The gas absorption at the laser turn-off point can be caused by gas spectral lines and/or broadband absorption and modifies the measured ringdown value. The system 100, in the illustrative embodiment, combines the modeling of the absorption dependent time response of the ICOS cavity 152 with the ringdown measurement in order to account for varying gas absorption at the ringdown measurement frequency and to calibrate the effective path length of the cavity 152 for estimation of the gas properties.

Additionally, as described above, in some applications it is not possible to completely eliminate etalon interferences because the source of the parasitic signal cannot be removed, and/or apparatuses such as piezo-electric transducers cannot be used in some environments due to cost or safety reasons. However, in at least some embodiments of the system 100, etalon signatures are added in the modeling parameters of the spectra to reduce the influence of the etalon on the estimation of gases concentrations in combination with the absorption dependent time response of the cavity 152.

A principal use of the invention is the accurate quantification of absorbers using a linear combination of basis sets and line sets with current-tuned semiconductor lasers. Examples of lasers that fall in this category are near-infrared distributed feedback lasers, interband cascade lasers (ICLs) and quantum cascade lasers (QCLs). All useful ICOS systems will operate in a regime where the skew effect cannot be ignored without loss of accuracy.

Figure 10:
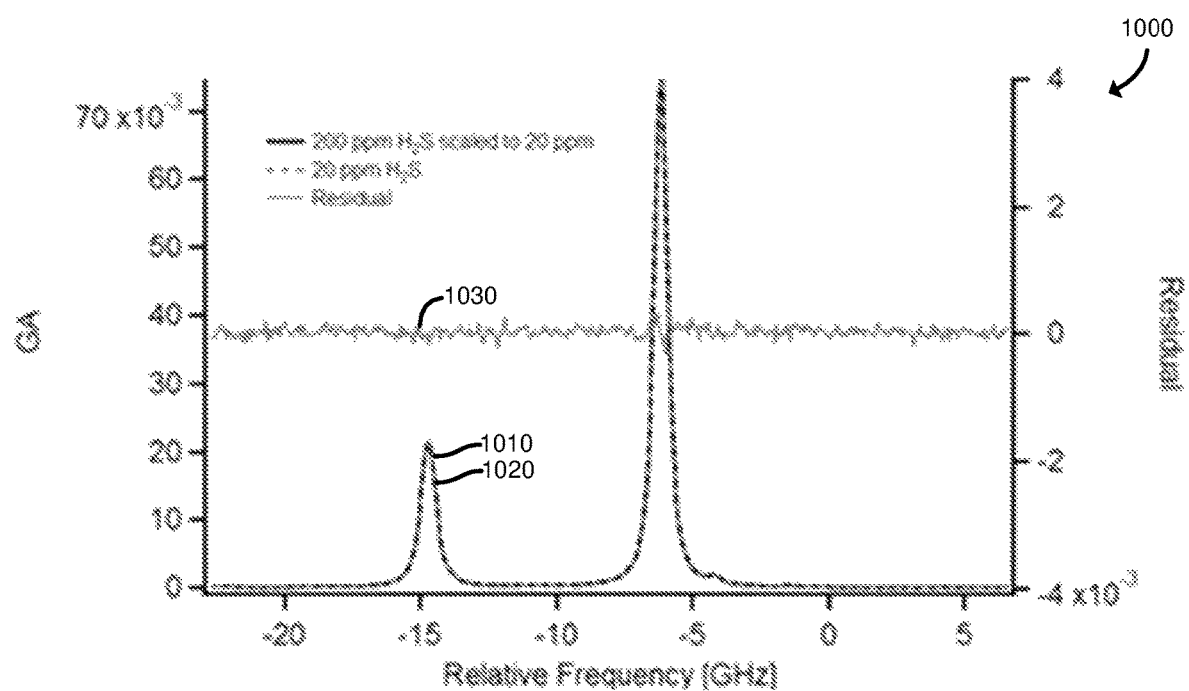
FIG. 10 is a chart of a measured absorption spectrum at 6.1 Hz for 20 ppm $H_2S$ and 200 ppm $H_2S$ scaled to 20 ppm.

An advantage of using basis sets skewed with an absorption dependent cavity time constant is that the model will more accurately fit the measured data, leading to an analyzer that is more accurate with a larger dynamic range and is less susceptible to cross interferences. The method starts with measuring basis sets at a slow scan rate such that the skew effect is negligible. These basis sets are linearly combined, and the resulting total GA is skewed using the absorption dependent cavity time constant equation. This skewed total GA is then compared to the measured spectrum. Referring to FIG. 10, a chart 1000 shows the agreement between a measurement 1020 of 20 ppm $H_2S$ and a measurement 1010 of 200 ppm $H_2S$ scaled to 20 ppm at a scan rate of 6.1 Hz. As indicated in the chart 1000, in the absence of skew, GA scales linearly. The residual 1030 is also shown in the chart 1000.

Figure 11:
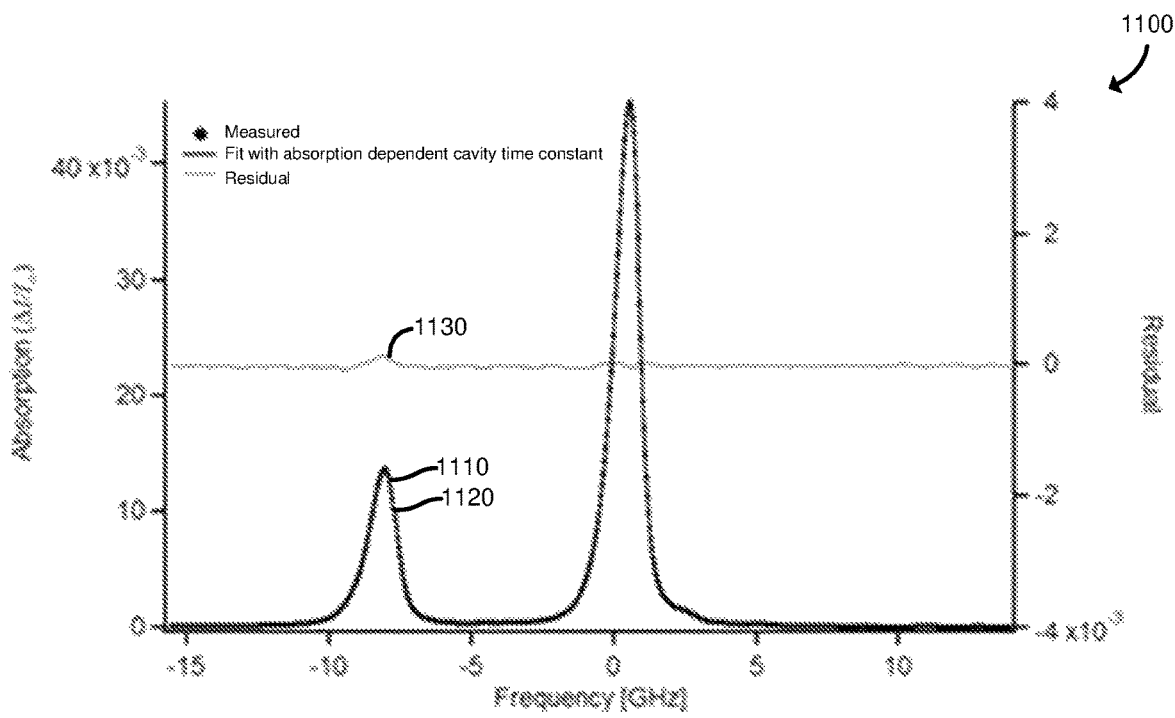
FIG. 11 is a chart of a measured absorption spectrum of 20 ppm $H_2S$ fit with a basis set, measured at 200 ppm, after being skewed with an absorption dependent cavity time constant algorithm.

Since the skew algorithm accurately models the absorption dependence of the cavity time constant, and the skew algorithm, in the illustrative embodiment, is applied after the linear combination of basis sets, the model accurately fits the measured data in the presence of skew. An example of this is shown in the chart 1100 of FIG. 11 where a basis set measured at 200 ppm $H_2S$ at a scan rate of 6.1 Hz (negligible skew) was scaled and then skewed (e.g., plot 1120) with the absorption dependent cavity time constant algorithm to fit a measurement 1110 of 20 ppm $H_2S$ at a scan rate of 610 Hz (significant skew). The residual 1130 between the fit and the measurement is less than 1% of the measured absorption. The error in this concentration measurement is only 0.23%. The concentration error is even less when fitting a measurements of 200 ppm $H_2S$, being only 0.0058%.

This simple example with very few, well resolved peaks demonstrates how using the skew formula with an absorption dependent cavity time constant leads to accurate results with very small residuals. As this method is extended to more complex and overlapping spectra the requirement for small residuals is even more important. As seen in FIGS. 5 and 6, the target gas is often a small absorption feature in the midst of many other larger absorption features. If a residual from one of the larger features happens to be located at the same frequency as the target gas absorption feature, the residual could be mistakenly fit as the target gas. Therefore, in the illustrative embodiment, the residual is reduced to lower the potential for cross interference and zero offsets. As seen in a comparison of the residuals in FIGS. 7 and 8, the utilization of basis sets skewed with an absorption dependent cavity time constant, as described herein, is a significant improvement over existing methods. In some embodiments, rather than using basis sets measured at a slow scan rate without skew, the basis sets may be developed from simulations based on first principles. Doing so may be helpful when attempting to adjust the broadening of individual lines since the sample likely has a different background than the background used when measuring the basis set.

The invention presented herein represents an improvement in the analysis of ICOS and related cavity enhanced absorption spectroscopy spectra in challenging gas matrices where calculated Voigt, Galatry, Rautian, speed dependent Voigt or other more complicated line shapes cannot be used or solely relied on. This innovation enables the use of ICOS technology for applications involving complex gas matrices such has hydrocarbon gases. One example application is the measurement of contaminants such as $H_2S$, $H_2O$, $CO_2$ and $O_2$ in natural gas. Natural gas is a complex mixture of hydrocarbon gases, which constituents depends on the production source and the treatments applied to the gas at various step of the production and distribution. These gases are corrosive contaminants in natural gas with no energy value. $H_2S$ is deadly, even at low ppm concentrations. Hydrates form in the presence of excess $H_2O$, causing a decrease in flowing capacity, potential blockage, and freezing. Gas processing and liquefied natural gas processes require relatively low $H_2O$ and $CO_2$ levels for an efficient cryogenic process to separate heavier hydrocarbons from lighter hydrocarbons. In addition to being corrosive, excess $O_2$ can degrade costly gas processing chemicals such as amines. Customers must continually monitor these contaminants to ensure that their levels remain within application dependent specifications. Currently, these measurements are taken by a variety of techniques, ranging from tunable diode laser spectroscopy (TDLAS) to simple electrochemical cells. But these technologies require more maintenance and/or calibration than ICOS technology implementing those innovations. The upstream/downstream natural gas industry requires the continuous measurement of one or many of these contaminants in multiple market segments, including: (i) gas production, downstream of knockout drum, scavenger injection control, and vapor recovery units; (ii) gas gathering, including gas dehydration, gas sweetening, and custody transfer; (iii) gas treatment, including gas dehydration and gas sweetening for custody transfer; (iv) transmission, for custody transfer; (v) compression; (vi) storage, including sales and receipt points and gas dehydration; (vii) gas processing, including sales and receipt points, glycol dehydration process, amine treatment process, mole sieve outlet, and liquefied natural gas sales delivery point; and (viii) fractionation, including measurements on finished products for custody transfer.

Another application where the innovations described herein provide a significant production cost, performance, and maintenance advantage is the measurement of contaminant in ethylene gas. Ethylene is one of the highest volume chemical produced in the world, with production exceeding 100 million metric tons per year. Ethylene is used in multiple industrial reactions such as polymerization, oxidation, halogenation and hydrohalogenation, alkylation, hydration, oligomerization, and hydroformylation. Presently, ethylene is produced with several methods in the petrochemical industry and is often mixed with other hydrocarbons. One contaminant of ethylene that is difficult to measurement accurately is acetylene. The innovations described herein reduce the cost and maintenance, and improve the performance of ICOS technology for the various market segments of ethylene production.

Figure 12:
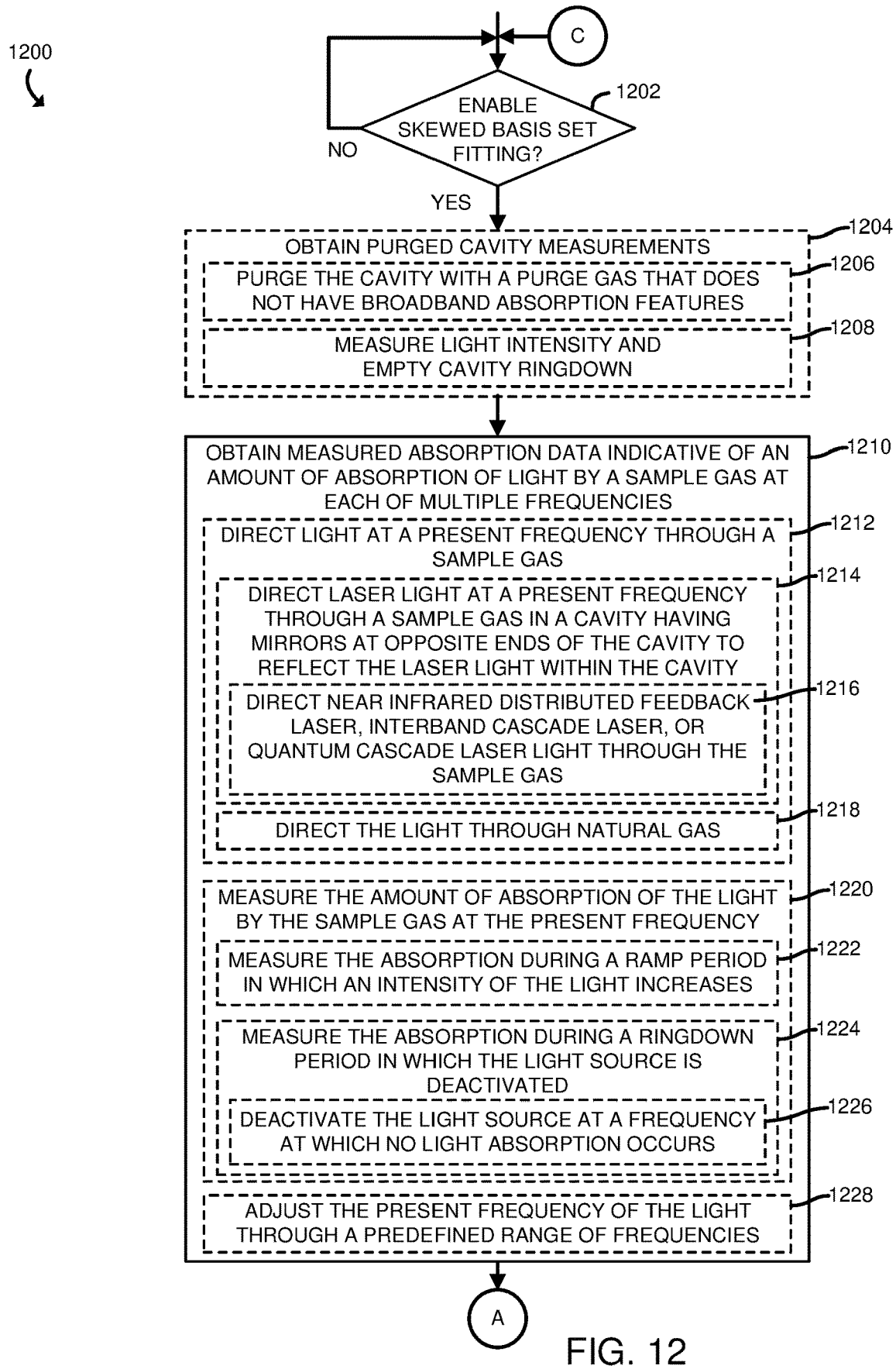
FIGS. 12-14 are simplified block diagrams of at least one embodiment of a method for skewed basis set fitting that may be performed by the system of FIG. 1.

Referring now to FIG. 12, the system 100 (e.g., the compute device 120 in communication with the absorption measurement device 110), in the illustrative embodiment, may execute a method 1200 for skewed basis set fitting. The method 1200 begins with block 1202 in which the compute device 120 determines whether to enable skewed basis fitting. In doing so, the compute device 120 may determine to enable skewed basis fitting in response to a request to do so (e.g., a request received from a user of the compute device 120 or from another compute device), in response to a determination that a configuration setting (e.g., in the data storage 222) indicates to enable skewed basis set fitting, and/or based on other factors. Regardless, in response to a determination to enable skewed basis set fitting, the system 100, in some embodiments, may obtain purged cavity measurements, as indicated in block 1204. In doing so, the system 100 may purge the cavity 152 with a purge gas (e.g., a nitrogen, air, or gas mixture that does not have broadband absorption features), as indicated in block 1206. After purging the cavity 152, the system 100 may measure light intensity and empty cavity ringdown, as indicated in block 1208. In other embodiments, the system 100 does not obtain purged cavity measurements.

As indicated in block 1210, the system 100 obtains measured absorption data indicative of an amount of absorption of light by a sample gas at each of multiple frequencies. As used herein, obtaining data may refer to generating data, receiving data from another, retrieving previously generated or received data from a memory or other data storage, and/or other similar actions. In block 1210, the system 100, in the illustrative embodiment, directs light (e.g., from the light source 130) at a present frequency through the sample gas, as indicated in block 1212. In the illustrative embodiment, and as indicated in block 1214, the system 100 directs laser light at a present frequency through the sample gas in a cavity that has mirrors at opposite ends of the cavity to reflect the laser light within the cavity (e.g., the cavity 152, with mirrors 136, 140 at opposite ends 138, 142). As discussed above, the mirrors 136, 140 increase the effective length of the cavity 152, thereby increasing the amount of light absorption by weakly absorbing gas components. In the illustrative embodiment, the method 1200 includes directing near infrared distributed feedback laser light, interband cascade laser light, or quantum cascade laser light through the sample gas, as indicated in block 1216. In the illustrative embodiment, the system 100 directs the light through natural gas (e.g., a natural gas mixture containing constituent gases), as indicated in block 1218.

As indicated in block 1220, the system 100 measures the amount of absorption of the light by the sample gas at the present frequency (e.g., based on the intensity of the light received by the detector device 146). In doing so, and as indicated in block 1222, the system 100 measures the absorption during a ramp period in which the intensity of the light increases (e.g., the ramp 910). Further, in block 1224, the system 100 measures the absorption during a ringdown period (e.g., the ringdown 930) in which the light source is deactivate (i.e., turned off). As indicated in block 1226, the system 100, in the illustrative embodiment, deactivates the light source at a frequency at which no light absorption occurs. As indicated in block 1228, the system 100 adjusts the present frequency of the light through a predefined range of frequencies (e.g., by selectively increasing or decreasing an electrical current through the light source 130). In the illustrative embodiment, the system 100 continually adjusts the present frequency through the range of frequencies as the light is directed through the cavity 152 and the light intensity at the detector device 146 is measured, to identify frequencies (wavelengths) at which gases within the sample gas exhibit differences in light absorption. As described above, the measurements produced by the detector device 146 are skewed due to the multiple reflections of light within the cavity and differences in the absorption of the light by the sample gas as the frequency is adjusted. Moreover, the measurements indicating absorption by the sample gas may be influenced by other factors (e.g., bias caused by electronics in the system 100, etalons, broadband gas absorption, etc.) as discussed above. As such, the system 100 may perform operations to account or compensate for such factors.

Figure 13:
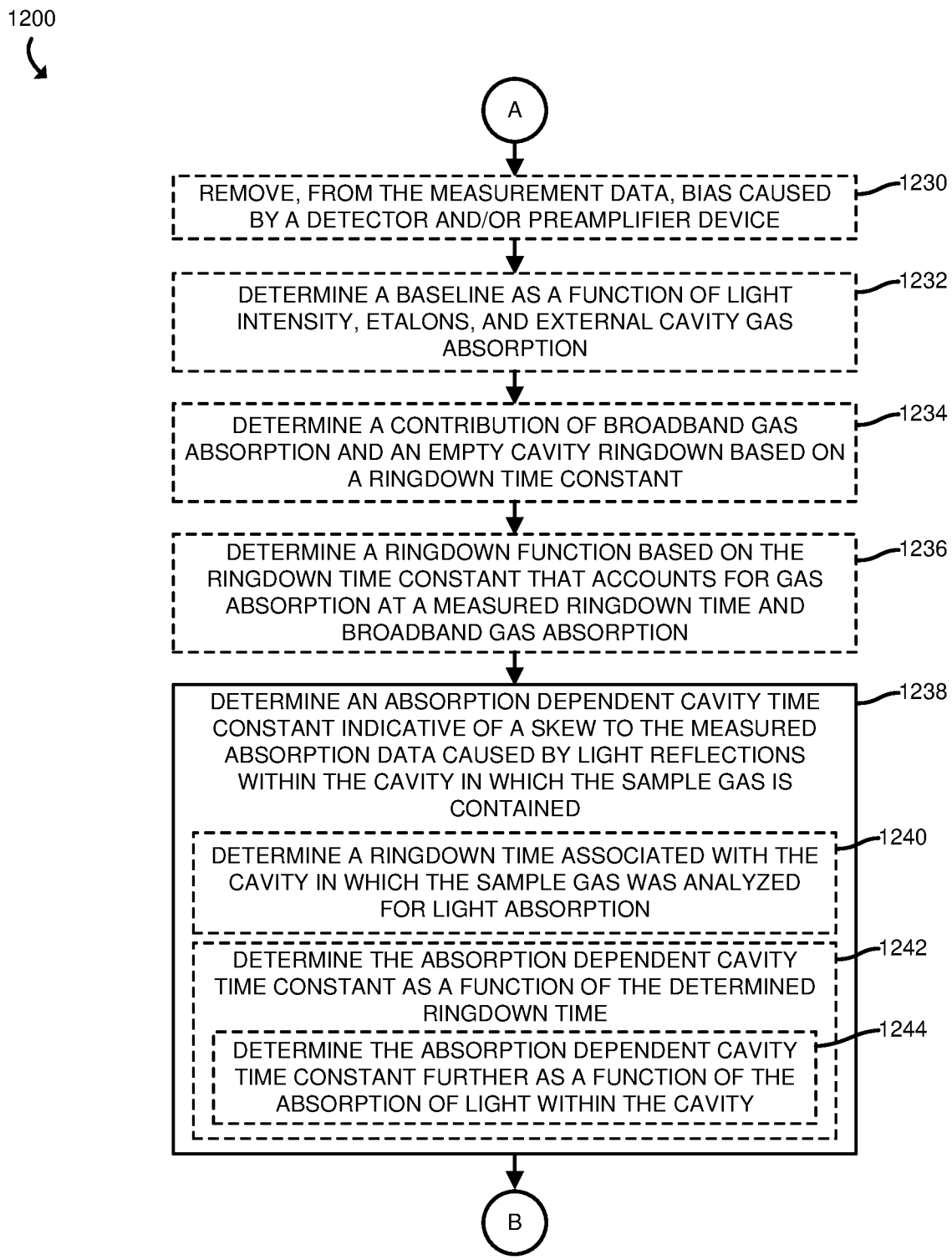

Referring now to FIG. 13, and as indicated in block 1230, the system 100 may remove, from the measurement data, bias caused by a detector (e.g., the detector device 146) and/or an amplifier device in the system 100. The system 100 may also determine a baseline as a function of light intensity, etalons, and external cavity gas absorption, as indicated in block 1232. The system 100 may also determine a contribution of broadband gas absorption and empty cavity ringdown based at least in part on a ringdown time constant, as indicated in block 1234. As indicated in block 1236, the system 100 may determine a ringdown function based at least in part on the ringdown time constant that accounts for gas absorption at a measured ringdown time and broadband gas absorption.

As indicated in block 1238, the system 100, in the illustrative embodiment, determines an absorption dependent cavity time constant that is indicative of a skew to the measured absorption data caused by light reflections within the cavity (e.g., the cavity 152) in which the sample gas is contained. In doing so, the system 100 may determine a ringdown time associated with the cavity 152 in which the sample gas was analyzed for light absorption, as indicated in block 1240. As indicated in block 1242, the system 100 may determine the absorption dependent cavity time constant as a function of (e.g., based at least in part on) the determined ringdown time. In the illustrative embodiment, the system 100 determines the absorption dependent cavity time constant further as a function of (e.g., based additionally on) the absorption of light within the cavity 152, as indicated in block 1244.

Figure 14:
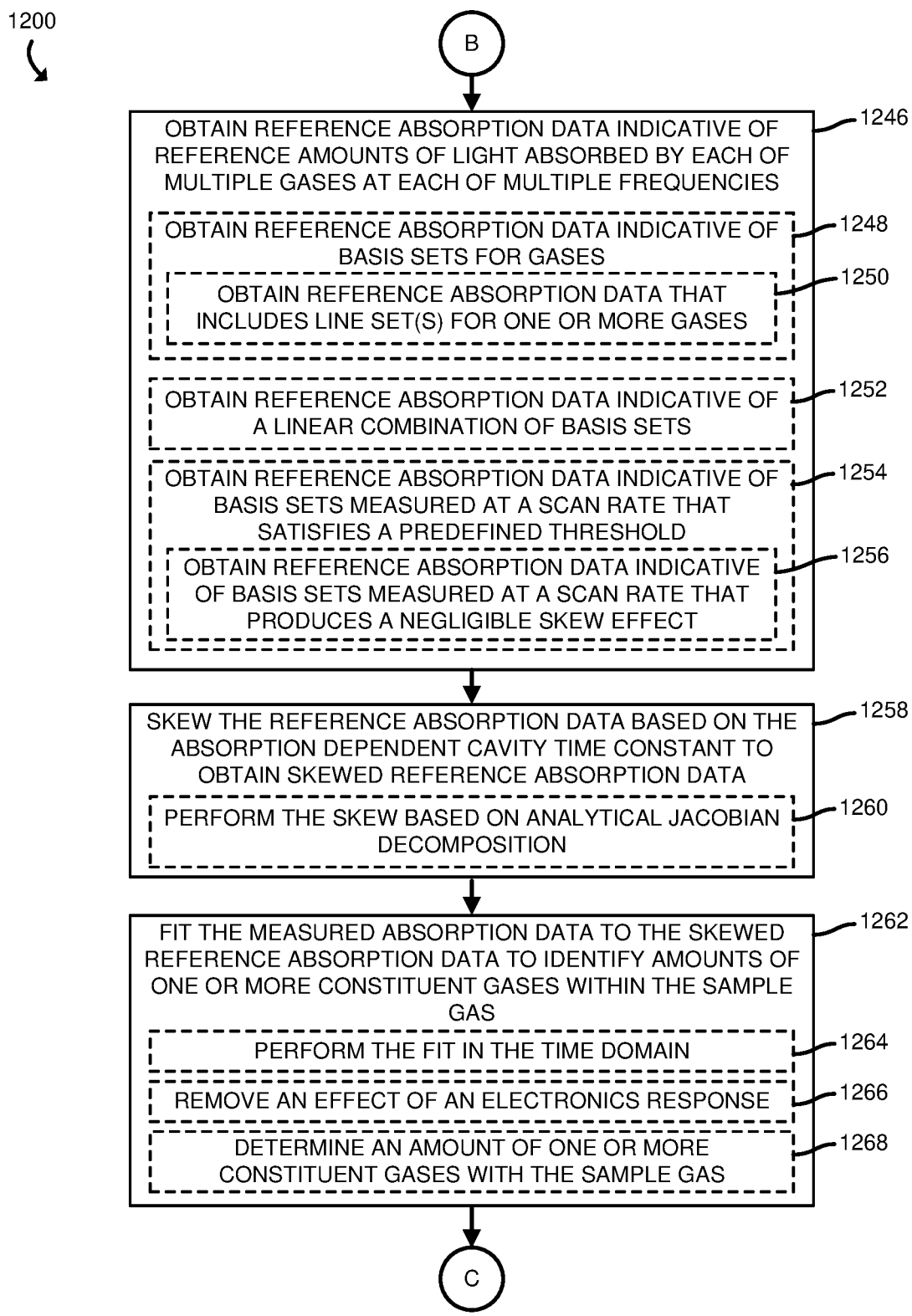

Referring now to FIG. 14, the system 100, in the illustrative embodiment, obtains (e.g., reads from the data storage 222 and/or memory 214) reference absorption data indicative of reference amounts of light absorbed by each of multiple gases at each of multiple frequencies, as indicated in bock 1246. In doing so, the system 100, in the illustrative embodiment, obtains reference absorption data indicative of basis sets for gases, as indicated in block 1248. The system 100 may additionally (or alternatively) obtain reference absorption data that includes one or more line sets for one or more gases, as indicated in block 1250. The system 100, in the illustrative embodiment, may obtain reference absorption data indicative of a linear combination of basis sets, as indicated in block 1252. In the illustrative embodiment, the system 100 obtains reference absorption data indicative of basis sets measured at a scan rate (e.g., a rate at which the frequency of the light 132 is changed) that satisfies a predefined threshold, as indicated in block 1254. For example and as indicated in block 1256, the system 100 may obtain reference absorption data indicative of basis sets measured at a scan rate that produces a negligible skew effect (e.g., a skew that is equal to or less than a predefined amount of skew defined as being negligible). As discussed above, with respect to FIG. 10, a scan rate of 6.1 Hz or less produces a negligible skew effect.

As indicated in block 1258, the system 100 skews the reference absorption data (e.g., from block 1246) based on the absorption dependent cavity time constant to generate skewed reference absorption data. In doing so, the system 100 may account for the skew based on analytical Jacobian decomposition, as indicated in block 1260. Additionally, and as indicated in block 1262, the system 100 fits the measured absorption data (e.g., from block 1210) to the skewed reference absorption data to identify amounts of one or more constituent gases within the sample gas. In doing so, the system 100 may perform the fit in the time domain, as indicated in block 1264. Further, and as indicated in block 1266, the system 100 may remove an effect of an electronics response (e.g., describe with reference to Equation 15) from the measured absorption data. As indicated in block 1268, the system 100 determines the amounts (e.g., concentrations) of one or more constituent gases within the sample gas (e.g., based on the fit of the skewed reference absorption data to the measured absorption data). The method 1200 may subsequent loop back to block 1202 of FIG. 12 to potentially perform skewed basis fitting on another sample gas.

While the operations of the method 1200 are illustrated and described with reference to FIGS. 12-14 in a particular order, it should be understood that many of the operations could be performed in a different order or concurrently. For example, the system 100 may, in some embodiments, obtain the reference absorption data (e.g., the basis sets) before obtaining the measured absorption data from the sample gas.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:

1. A method comprising:
    obtaining, by a compute device, measured absorption data indicative of an amount of absorption of light by a sample gas at each of multiple frequencies;
    determining, by the compute device, an absorption dependent cavity time constant indicative of a skew to the measured absorption data caused by light reflections within a cavity in which the sample gas is contained;
    obtaining, by the compute device, reference absorption data including basis sets indicative of reference amounts of light absorbed by each of multiple gases at each of the multiple frequencies;
    skewing, by the compute device, the reference absorption data based on the absorption dependent cavity time constant to generate skewed reference absorption data; and
    fitting, by the compute device, the measured absorption data to the skewed reference absorption data to identify an amount of at least one constituent gas within the sample gas.

2. The method of claim 1, wherein obtaining reference absorption data comprises obtaining a linear combination of basis sets.

3. The method of claim 1, wherein obtaining reference absorption data comprises obtaining reference absorption data that additionally includes at least one line set.

4. The method of claim 1, wherein the method further comprises determining an effect of at least one of external cavity gas absorption, broadband gas absorption, or etalons on the measured data.

5. The method of claim 1, wherein skewing the reference absorption data comprises performing analytical Jacobian decomposition.

6. The method of claim 1, further comprising determining an effect of collision broadening on one or more basis sets or a combination of higher order derivatives of basis sets.

7. The method of claim 1, further comprising:
purging the cavity with a purge gas; and
measuring a light intensity and an empty cavity ringdown in the purged cavity before obtaining the measured absorption data.

8. The method of claim 1, wherein fitting the measured absorption data comprises fitting the measured absorption data to the skewed reference absorption data in a time domain.

9. The method of claim 1, wherein obtaining reference absorption data comprises obtaining reference absorption data indicative of basis sets measured at a scan rate that satisfies a predefined threshold.

10. The method of claim 9, wherein obtaining reference absorption data comprises obtaining data indicative of basis sets measured at a scan rate that produces an amount of skew that is less than a reference amount of skew.

11. The method of claim 1, wherein fitting the measured absorption data comprises removing an effect of an electronics response from the measured absorption data.

12. The method of claim 1, wherein obtaining the measured absorption data comprises directing light through the sample gas and measuring the amount of absorption of the light by the same gas while adjusting the frequency through a predefined range of frequencies.

13. The method of claim 1, wherein obtaining the measured absorption data comprises directing laser light through the sample gas in a cavity having mirrors at opposite ends of the cavity to reflect the laser light within the cavity.

14. The method of claim 1, wherein obtaining the measured absorption data comprises directing light through natural gas.

15. The method of claim 1, further comprising measuring the amount of absorption of light by the sample gas during a ramp period in which an intensity of the light changes.

16. The method of claim 1, further comprising measuring the amount of absorption of light by the sample gas during a ringdown period in which a source of the light is deactivated.

17. The method of claim 16, further comprising deactivating the source of the light at a frequency at which a negligible amount of light absorption occurs.

18. One or more machine-readable storage media comprising a plurality of instructions stored thereon that, in response to being executed, cause a compute device to perform the method of claim 1.

19. A system comprising:
a compute device with circuitry configured to:
obtain measured absorption data indicative of an amount of absorption of light by a sample gas at each of multiple frequencies;
determine an absorption dependent cavity time constant indicative of a skew to the measured absorption data caused by light reflections within a cavity in which the sample gas is contained;
obtain reference absorption data including basis sets indicative of reference amounts of light absorbed by each of multiple gases at each of the multiple frequencies;
skew the reference absorption data based on the absorption dependent cavity time constant to generate skewed reference absorption data; and
fit the measured absorption data to the skewed reference absorption data to identify an amount of at least one constituent gas within the sample gas.

20. The system of claim 19, further comprising:
an absorption measurement device communicatively coupled to the compute device, wherein the absorption measurement device includes:
a chamber having at least two mirrors and defining the cavity to contain the sample gas;
a light source configured to transmit the light through the cavity; and
a detector device configured to measure an intensity of the light transmitted through the cavity.

21. A method comprising:
obtaining, by a compute device, measured absorption data indicative of an amount of absorption of light by a sample gas at each of multiple frequencies;
determining, by the compute device, an absorption dependent cavity time constant indicative of a skew to the measured absorption data caused by light reflections within a cavity in which the sample gas is contained;
obtaining, by the compute device, reference absorption data including line sets indicative of reference amounts of light absorbed by each of multiple gases at each of the multiple frequencies;
skewing, by the compute device, the reference absorption data based on the absorption dependent cavity time constant to generate skewed reference absorption data; and
fitting, by the compute device, the measured absorption data to the skewed reference absorption data to identify an amount of at least one constituent gas within the sample gas;
wherein the method further comprises determining an effect of at least one of external cavity gas absorption, broadband gas absorption, or etalons on the measured absorption data, or wherein skewing the reference absorption data includes performing analytical Jacobian decomposition.

* * * * *